United States Patent [19]
Bessho

[11] Patent Number: 5,898,795
[45] Date of Patent: Apr. 27, 1999

[54] CHARACTER RECOGNITION METHOD USING A METHOD FOR DELETING RULED LINES

[75] Inventor: Goro Bessho, Yokohama, Japan

[73] Assignee: Ricoh Company, Ltd., Tokyo, Japan

[21] Appl. No.: 08/762,439

[22] Filed: Dec. 9, 1996

[30] Foreign Application Priority Data

Dec. 8, 1995 [JP] Japan ................................ 7-320066
Dec. 25, 1995 [JP] Japan ................................ 7-336690

[51] Int. Cl.⁶ .......................................................... G06K 9/34
[52] U.S. Cl. .......................... 382/173; 382/203; 382/298
[58] Field of Search .................................. 382/173, 203, 382/235, 258, 291, 298; 707/510

[56] References Cited

U.S. PATENT DOCUMENTS 5,048,107  9/1991  Tachikawa .............................. 382/173
5,729,635  3/1998  Fast et al. .............................. 382/254

FOREIGN PATENT DOCUMENTS 56-9877    1/1981  Japan .
61-196382  8/1986  Japan .
2-7183     1/1990  Japan .
3-172984   7/1991  Japan .

OTHER PUBLICATIONS

English language abstract of the Japanese '877 application, Jan. 1981.
English language abstract of the Japanese '382 application, Aug. 1986.
English language abstract of the Japanese '183 application, Jan. 1990.
English language abstract of the Japanese '984 application, Jul. 1991.

*Primary Examiner*—Phuoc Tran
*Attorney, Agent, or Firm*—Dickstein Shapiro Morin & Oshinsky LLP

[57] ABSTRACT

A character recognition method which accurately recognizes characters contacting or adjacent to a ruled line. Black runs each having a length greater than a predetermined length are extracted from the original binary image. A ruled line rectangle defined by adjacent black runs is extracted from among the extracted black runs so that the ruled line rectangle completely encircles the adjacent black runs which are within a predetermined short distance from each other. Black pixels contained in the ruled line rectangle are deleted from the original binary image. Then, a recognition is performed for characters contained in the original binary image.

40 Claims, 17 Drawing Sheets

CHARACTER RECOGNITION METHOD USING A METHOD FOR DELETING RULED LINES

BACKGROUND OF THE INVENTION

1. Field of the Invention

The present invention generally relates to an image processing method for processing image data obtained from a ruled document and, more particularly, to a method for deleting ruled lines contained in image data obtained by scanning a document and a character recognition method using such a method for accurately recognizing characters surrounded by or adjacent to the ruled lines.

2. Description of the Related Art

Many documents or preformatted sheets are provided with ruled lines or frame lines. In order to read characters within an area defined by the ruled lines or frame lines, it is common to distinguish the characters from the ruled lines or frame lines by providing different colors to the rules lines or frame lines and the characters, as is suggested in Japanese Laid-Open Patent Application No.56-9877. In this method, image information obtained by optically scanning a document having ruled lines or frame lines is classified into each color image information. To use this method, ruled lines or frame lines must be printed with a predetermined specific color by considering the spectral characteristic of scanners to be used. Thus, there is a problem in that cost for preparing or printing a document with colored ruled lines or frame lines must be added to the cost of the blank document. That is, an additional cost is required for printing the ruled lines or frame lines with a specific color. Additionally, it is inconvenient for a user to use a writing tool of a specific color which is different from the color of the ruled lines or frame lines when writing characters within the area defined by the ruled lines or frame lines.

On the other hand, in recent years, it has become common to print the ruled lines or frame lines on a regular print paper by a word processor. Japanese Laid-Open Patent Applications No. 61-196382 and No. 2-7183 suggest methods for separating characters from ruled lines or frame lines. In these methods, a histogram of high-intensity pixels in the image obtained from the document is produced. The ruled lines or frame lines are extracted from a peak of the histogram so as to delete the ruled lines or frame lines prior to performing a recognition process of characters in the area defined by the ruled lines or frame lines.

However, the method suggested in Japanese Laid-Open Patent Application No. 61-196382 has a problem in that an area defined by the ruled lines or frame lines cannot be accurately detected when the document provided with the ruled lines or frame lines is inclined with respect to the scanning direction since positions of the ruled lines or frame lines are detected from the histogram of high-intensity pixels (black pixels). Additionally, the method suggested in Japanese Laid-Open Patent Application No. 2-7183 has a problem in that an area of the ruled lines or frame lines for an unknown document cannot be accurately detected for an unknown document since an area divided by the ruled lines or frame lines cannot be accurately recognized. This is because, in the method suggested in Japanese Laid-Open Patent Application No. 2-7183, extending ranges of the ruled lines or frame lines are detected from projection patterns obtained by dividing the document area along a direction perpendicular to a direction of lines in the document.

When character recognition is performed on a document image including ruled lines or frame lines, the characters should be recognized, in most cases, by an area (hereinafter referred to as a ruled area) encircled by ruled lines or frame lines. In order to achieve this, the ruled lines or frame lines must be detected before the character recognition is performed.

As a method for recognizing the ruled area, it is common to recognize the ruled area as rectangular areas by extracting the vertical and horizontal ruled lines and using coordinate values of the inner sides of the rectangular areas. However, there is a problem in that the ruled area is recognized as an area smaller than the actual ruled area when the scanned image or the document is inclined, as described below.

A description will now be given in more detail, with reference to FIG. 1, of the above-mentioned problem. FIG. 1 shows the ruled area defined by horizontal ruled lines 300 and 301, and vertical ruled lines 303 and 304. If the ruled area is inclined as shown in FIG. 1, a width of each the rectangular areas 300a, 301a, 303a and 304a corresponding to the respective ruled lines 300, 301, 303 and 304 is increased in response to a degree of inclination. In FIG. 1, the ruled area recognized by using coordinate values of the inner sides of the rectangular areas 300a, 301a, 303a and 304a corresponds to the rectangular area defined by points Aa, Ba, Ca and Da. Since the actual ruled area corresponds to a rectangular area defined by points A, B, C and D, the recognized ruled area is smaller than the actual ruled area. Thus, in this method, parts of characters adjacent to the ruled lines may be encompassed within the rectangular areas, resulting in an inaccurate recognition of the characters.

Japanese Laid-Open Patent Application No. 3-172984 suggests a different method. In this method, similarly to the above-mentioned method, rectangular areas corresponding to vertical and horizontal ruled lines are extracted so as to define the ruled area. However, in this method, the ruled area is recognized based on the outer sides of the rectangular areas. That is, in this method, the ruled area is recognized as a rectangular area defined by points Ab, Bb, Cb and Db shown in FIG. 1. This rectangular area recognized as the ruled area is larger than the actual ruled area defined by the points A, B, C and D. In this method, characters are extracted by using the rectangular area defined by the points Ab, Bb, Cb and Db. Thus, the number of characters which are not accurately recognized are decreased.

However, in the method suggested in Japanese Laid-Open Patent Application No. 3-172984, when inclination of the document is large, the black runs corresponding to the characters contacting or adjacent to a ruled line may be combined with the black runs corresponding to that ruled line. As a result, the characters contacting or adjacent to the ruled line may not be accurately recognized. Additionally, there is a problem in that characters outside the ruled area defined by the actual ruled lines may be erroneously recognized as characters included in the ruled area since the assumed ruled area is larger than the actual ruled area.

SUMMARY OF THE INVENTION

It is a general object of the present invention to provide an improved and useful method for deleting ruled lines and a character recognition method using the method for deleting ruled lines in which the above-mentioned problems are eliminated.

A more specific object of the present invention is to provide a character recognition method which accurately recognizes characters contacting or adjacent to a ruled line.

Another object of the present invention is to provide a character recognition method which accurately recognizes characters in an unknown document having ruled lines or frame lines and also underlines.

Another object of the present invention is to provide a method for deleting ruled lines which can accurately delete ruled lines even when a character image to be recognized is inclined.

Another object of the present invention is to provide a method for deleting ruled lines or frame lines even when a character image to be recognized is in contact with a ruled line.

Another object of the present invention is to provide a method for deleting ruled lines or frame lines in which a memory capacity necessary for the deletion is reduced.

In order to achieve the above-mentioned objects, there is provided according to one aspect of the present invention a character recognition method for recognizing characters from an original binary image containing characters encircled by ruled lines, both the characters and the ruled lines being defined by black runs comprising consecutive black pixels, the character recognition method comprising the steps of:

a) extracting black runs each having a length greater than a predetermined length from the original binary image;

b) extracting a ruled line rectangle defined by adjacent black runs from among the black runs extracted in step a) so that the ruled line rectangle completely encircles the adjacent black runs which are within a predetermined short distance from each other;

c) deleting black pixels contained in the ruled line rectangle from the original binary image; and d) recognizing characters contained in the original binary image processed by step c).

According to the above-mentioned invention, characters are recognized after ruled lines are deleted. The ruled lines are recognized as the ruled line rectangles each of which contains a set of black runs adjacent to each other. Thus, the entire ruled line is positively recognized even when the original binary image is inclined with respect to the scanning direction and there is fluctuation in the image corresponding to the ruled line. This results in an accurate recognition of characters adjacent to or contacting the ruled lines.

In one embodiment of the character recognition method according to the present invention, step c) may comprise the step of:

c-1) changing black pixels contained in the ruled line rectangle to white pixels.

In the character recognition method according to the present invention, step a) may comprise the steps of:

a-1) compressing the binary image by a logical sum compression method so as to obtain a compressed binary image; and a-2) extracting the black runs from the compressed binary image.

According to this invention, since the ruled line rectangles are extracted in a compressed form obtained by the logical sum compression method, the ruled line rectangles after expansion are slightly enlarged as compared to the original ruled line. Thus, fluctuation in the image of the ruled lines is absorbed in the enlarged ruled line, and an interruption of a black run corresponding to the ruled line is automatically eliminated.

Additionally, step b) may include the steps of:

b-1) obtaining coordinate values of diagonal vertices of the ruled line rectangle; and b-2) converting the coordinate values of the compressed binary image into coordinate values of the original binary image so that the ruled line rectangle is extracted from the original binary image.

In one embodiment of the present invention, step c) may comprise the steps of:

c-2) enlarging the ruled line rectangle; and c-3) changing black pixels contained in the enlarged ruled line rectangle to white pixels.

Additionally, step c-2) may include the step of:

c-2-1) determining a degree of enlargement of the ruled line rectangle based on a width of the ruled line rectangle.

In the character recognition method according to the present invention, step c) may include the steps of:

c-4) extracting a black run rectangle adjacent to the ruled line rectangle, the black run rectangle containing at least one black run having a length less than a predetermined length and located within a predetermined distance from the ruled line rectangle; and c-5) changing black pixels contained in the black run rectangle extracted in step c-4) to white pixels.

The character recognition method according to the present invention may further comprise, before step a), the steps of:

m) calculating a certainty level of each of characters recognized from the original binary image; and n) proceeding to step a) when the certainty level of at least one of the characters is lower than a predetermined level.

In this invention, a character recognition is first performed in a simple manner, and the certainty of each of the characters is calculated. If the certainty of one of the characters is lower than a predetermined level, it is determined that the recognition is influenced by the ruled lines. Thus, in this invention, the character recognition is performed on the image from which the low certainty level is obtained after deleting the ruled lines. This ensures an accurate recognition of characters.

Additionally, step m) may include the step of:

m-1) extracting ruled lines contained in the original binary image;

m-2) extracting a frame area encircled by the ruled lines;

m-3) extracting a character image contained in the frame area;

m-4) recognizing the characters in the character image; and m-5) calculating the certainty level of each of the characters.

There is provided according to another aspect of the present invention a method for deleting ruled lines from an original binary image obtained by scanning a document, both characters and the ruled lines being defined by black runs comprising consecutive black pixels, the method comprising the steps of:

a) extracting black runs each having a length greater than a predetermined length from the original binary image;

b) extracting a ruled line rectangle defined by adjacent black runs from among the black runs extracted in step a) so that the ruled line rectangle completely encircles the adjacent black runs which are within a predetermined short distance from each other; and c) deleting black pixels contained in the ruled line rectangle from the original binary image.

According to the above-mentioned invention, characters are recognized after ruled lines are deleted. The ruled lines are recognized as the ruled line rectangles each of which contains a set of black runs adjacent to each other. Thus, the entire ruled line is positively recognized even when the original binary image is inclined with respect to the scanning direction and there is fluctuation in the image corresponding to the ruled line.

In one embodiment, step c) may comprise the step of:

c-1) changing black pixels contained in the ruled line rectangle to white pixels.

In the method for deleting ruled lines according to the present invention, step a) may comprise the steps of:

a-1) compressing the binary image by a logical sum compression method so as to obtain a compressed binary image; and a-2) extracting the black runs from the compressed binary image.

Additionally, step b) may include the steps of:

b-1) obtaining coordinate values of diagonal vertices of ruled the line rectangle; and b-2) converting the coordinate values of the compressed binary image into coordinate values of the original binary image so that the ruled line rectangle is extracted from the original binary image.

In the method for deleting ruled lines according to the present invention, step c) may comprise the steps of:

c-2) enlarging the ruled line rectangle; and c-3) changing black pixels contained in the enlarged ruled line rectangle to white pixels.

Additionally, step c-1) may include the step of:

c-2-1) determining a degree of enlargement of the ruled line rectangle based on a width of the ruled line rectangle.

In the method for deleting ruled lines according to the present invention, step c) may include steps of:

c-4) extracting a black run rectangle adjacent to the ruled line rectangle, the black run rectangle containing at least one black run having a length less than a predetermined length and located within a predetermined distance from the ruled line rectangle; and c-5) changing black pixels contained in the black run rectangle extracted in step c-4) to white pixels.

In the method for deleting ruled lines according to the present invention, step c) may include the steps of:

c-6) extracting a frame area encircled by ruled line rectangles extending in a primary scanning direction and a secondary scanning direction, the frame area being defined by an outer side of each of the ruled line rectangles with respect to the center of the frame area;

c-7) deleting the ruled lines from a character image contained in the frame area by changing black pixels contained in the black runs extracted in step a) to white pixels; and c-8) changing black pixels contained in a black run contacting each side of the frame area to white pixels.

According to this invention, since each side of the frame area corresponds to an outer side of each of the ruled line rectangles defining the frame area, the black run rectangle contacting one of the sides of the frame area is considered to correspond to black runs intruding from outside of the frame area. The intrusion of a black run is increased as the inclination of the image is increased. Thus, this invention is particularly effective in eliminating black runs which belong to an adjacent frame area. This results in an accurate recognition of characters within each frame area of an image inclined with respect to the scan line.

Additionally, step c-8) may include the step of:

c-8-1) changing black pixels contained in a black run positioned between one of the sides of the frame area and the black run adjacent to the one of the sides of the frame area within the frame area to white pixels.

There is provided according to another aspect of the present invention a character recognition method for recognizing characters from an original binary image containing characters encircled by ruled lines, both the characters and the ruled lines being defined by black runs comprising consecutive black pixels, the character recognition method comprising the steps of:

a) extracting black runs each having a length greater than a predetermined length from the original binary image;

b) extracting ruled line rectangles defined by adjacent black runs from among the black runs extracted in step a) so that the ruled line rectangle completely encircles the adjacent black runs which are within a predetermined short distance from each other;

c) extracting a frame area encircled by the ruled line rectangles extending in a primary scanning direction and a secondary scanning direction, the frame area being defined by an outer side of each of the ruled line rectangles with respect to the center of the frame area;

d) deleting the ruled lines from a character image contained in the frame area by changing black pixels contained in the black runs extracted in step a) to white pixels;

e) changing black pixels contained in a black run contacting one of sides of the frame area to white pixels; and f) recognizing characters contained in a character image in the frame area of the original binary image.

According to this invention, since each side of the frame area corresponds to an outer side of each of the ruled line rectangles defining the frame area, the black run rectangle contacting one of the sides of the frame area is considered to correspond to black runs intruding from outside of the frame area. The intrusion of a black run is increased as the inclination of the image is increased. Thus, this invention is particularly effective in eliminating black runs which belong to an adjacent frame area.

In the above-mentioned character recognition method, step e) may include the step of:

e-1) changing black pixels contained in a black run positioned between one of the sides of the frame area and the black run adjacent to the one of the sides of the frame area within the frame area to white pixels.

The character recognition method and the method for deleting ruled lines may be performed by a general purpose computer with a processor readable medium storing program code means causing the computer to perform the steps provided in the method according to the present invention.

Other objects, features and advantages of the present invention will become more apparent from the following detailed description when read in conjunction with the accompanying drawings.

DETAILED DESCRIPTION OF THE PREFERRED EMBODIMENTS

Figure 2:
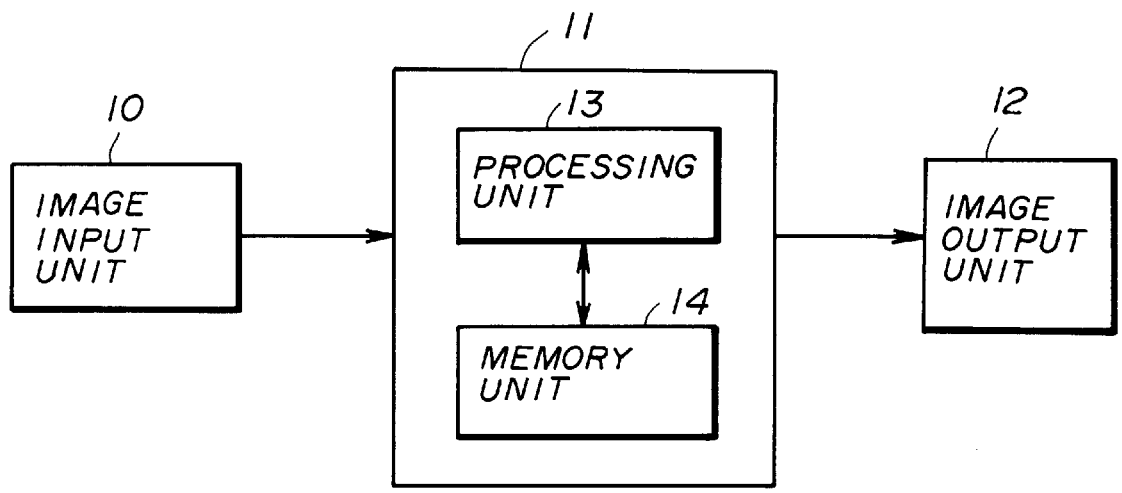
FIG. 2 is a schematic illustration of a structure of a character recognition system in which a character recognition method according to the present invention is carried out.

A description will now be given of an entire system which performs a character recognition method including a method for deleting ruled lines according to the present invention. FIG. 2 is a schematic illustration of a structure of the character recognition system in which the character recognition method according to the present invention is carried out. The character recognition system shown in FIG. 2 generally comprises an image input unit 10, an image data processing unit 11 and an image output unit 12. The image input unit 10 obtains image data from a document and supplies it to the image data processing unit 11. The image data processing unit 11 comprises a processing unit 13 and a memory unit 14. The processing unit 13 processes the image data supplied by the image input unit 10 so as to recognize characters contained in the image data. The memory unit 14 comprises a plurality of memories which store the image data and interim data necessary for performing the character recognition process. The resultant image data or character data is output to the image output unit 12 which displays or print the resultant image or character data.

Figure 3:
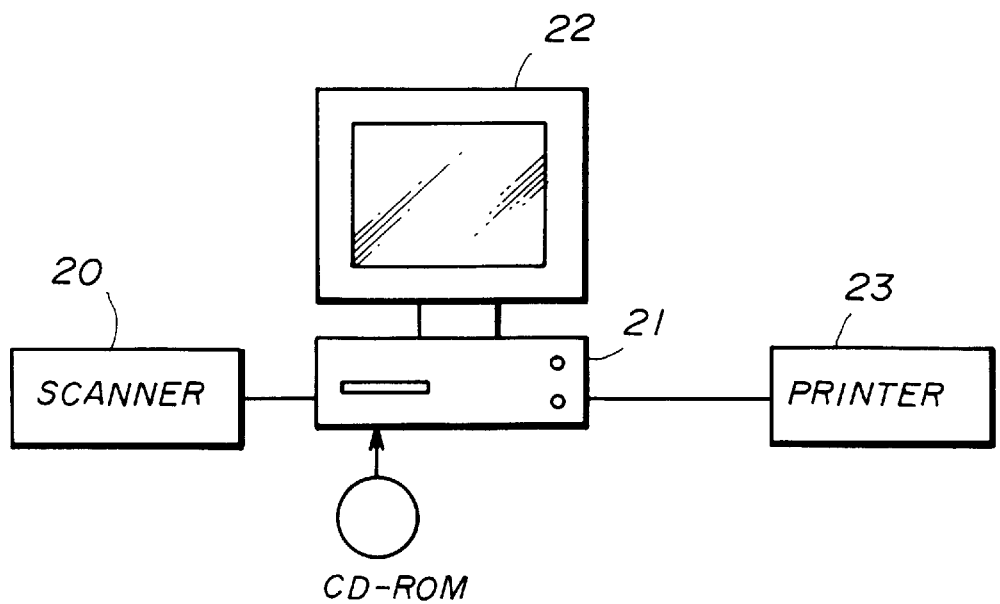
FIG. 3 is a block diagram of an entire structure of the character recognition system according to the present invention.

FIG. 3 shows an example of the above-mentioned character recognition system. In FIG. 3, a scanner 20 corresponding to the image input unit 10 generates image data by optically scanning a document. A personal computer 21 corresponds to the image data processing unit 11. A CRT display 22 and a printer 23 correspond to the image output unit 12. The personal computer 21 can be a general purpose computer available on the market. In this construction, a program produced for performing the character recognition method according to the present invention is input to the personal computer by a computer readable recording medium such as a CD-ROM or the like. The program may be stationary stored in a memory of the personal computer. Alternatively, instead of using a personal computer, an exclusive device originally designed for performing the character recognition method can be used. Since a known hardware can be used for a personal computer or such an exclusive device, descriptions thereof will be omitted.

Figure 4:
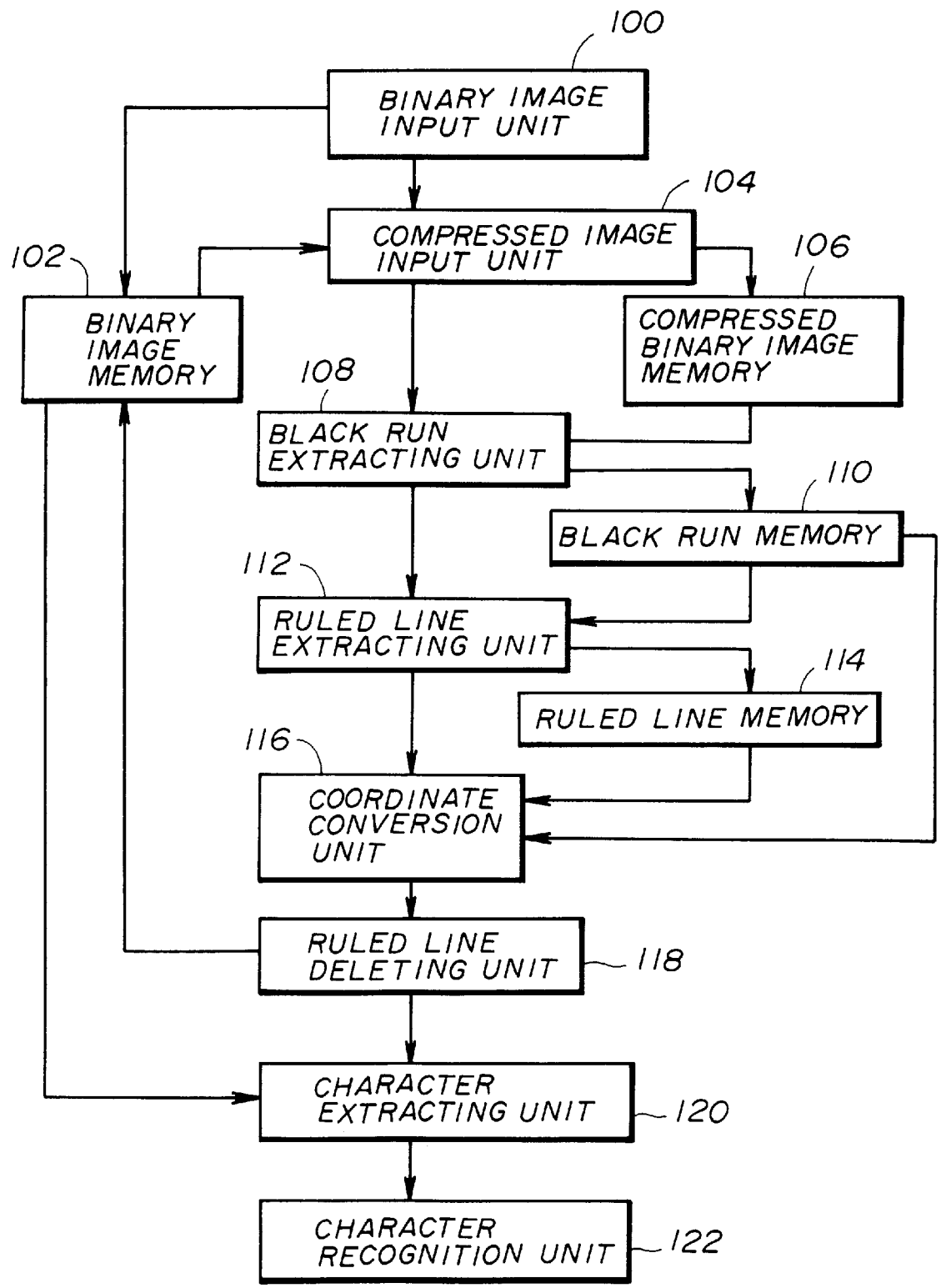
FIG. 4 is a block diagram of a character recognition system which uses a first embodiment of the character recognition method according to the present invention.
Figure 5:
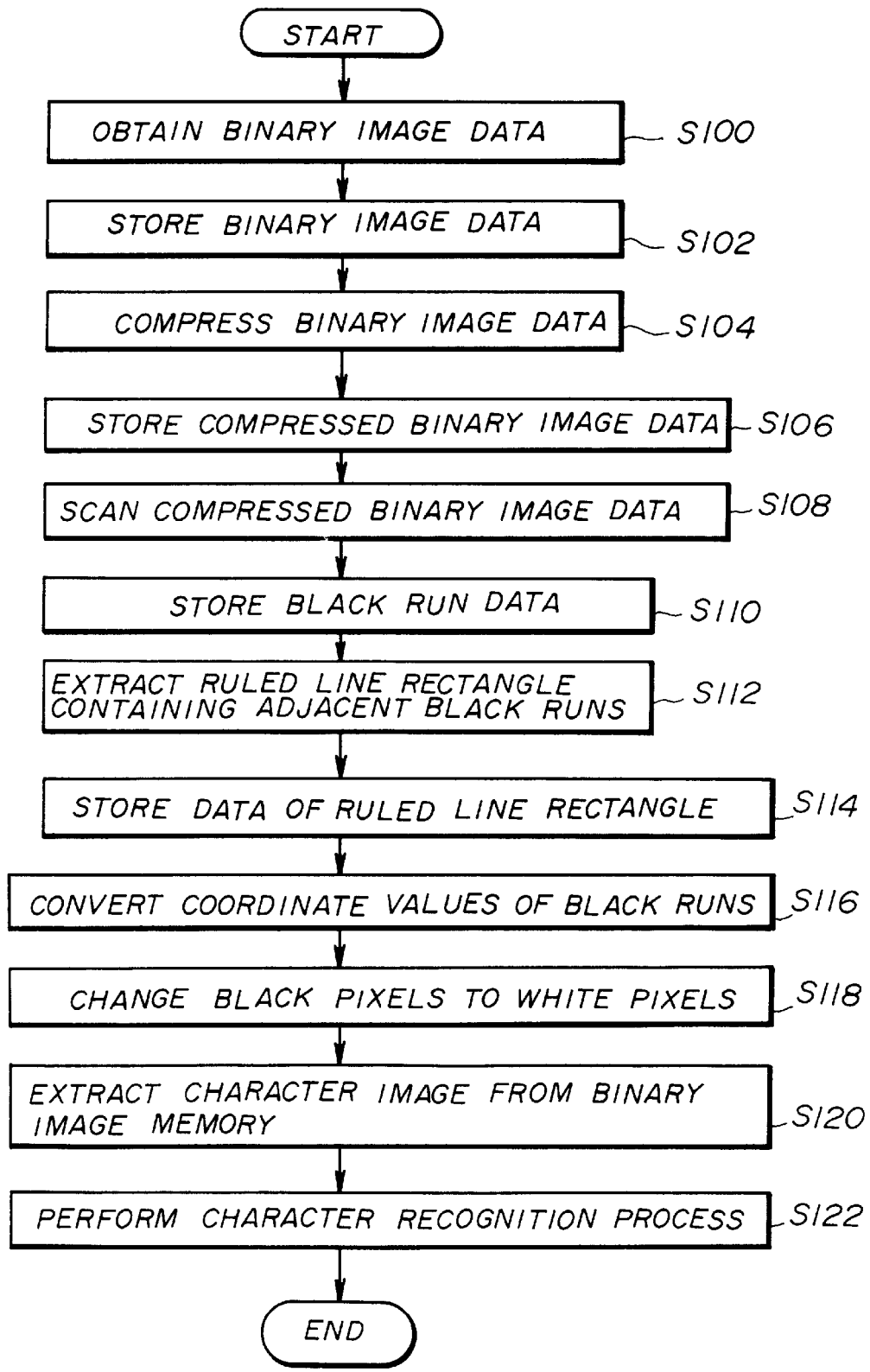
FIG. 5 is a flowchart of a character recognition process performed by the character recognition system shown in FIG. 4.

A description will now be given of a first embodiment of the character recognition method according to the present invention. FIG. 4 is a block diagram of a character recognition system which uses the first embodiment of the character recognition method according to the present invention. FIG. 5 is a flowchart of a character recognition process performed by the character recognition system shown in FIG. 4.

When the character recognition process shown in FIG. 5 is started, an image of a document or preformatted sheet is scanned, in step S100, by a binary image input unit 100 such as an image scanner. The binary image data of the document is stored in a binary image memory 102 in step 102. Then, in step S104, the binary image data is compressed by a compressed image generating unit 104. The compressed binary image data is stored, in step S106, in a compressed binary image memory 106. A compression ratio such as 1/4, 1/8, . . . is used to facilitate digital processing of the compression. An OR (logical sum) compression method is used for the compression of the binary image data. In the OR compression method, for example, all of four pixels in a 2×2 pixel matrix are regarded as black pixels when at least one of the four pixels is a black pixel. A known method other than the OR compression method may be used. The reason for using the OR compression is to ensure extraction of a ruled line even when the ruled line is recognized as being interrupted due to coarse resolution of the image scanner or errors in binarizing process as described later. Additionally, the reason for using not the original binary image data but the compressed binary image data is to eliminate or reduce influence of fluctuation generated in peripheral portions of an image due to coarse resolution of the image scanner or errors in the binarizing process.

The compressed binary image is used only for extracting black runs, as will be described later. The black run in this specification refers to a recognized block of consecutive high-intensity pixels (black pixels). The deletion of the ruled lines is performed on the original binary image data stored in the binary image memory 102. The reason for providing both the memory for the extracted image data and the memory for the deletion of ruled lines is to facilitate the deletion of the ruled lines when the ruled lines include both horizontal ruled lines and vertical ruled lines. If a single memory is commonly used for both processes, and if an extraction of a vertical ruled line is performed after a horizontal ruled line is deleted, a black run corresponding to the intersection between the horizontal ruled line and the vertical ruled line cannot be extracted since it has been already deleted. In this embodiment, the two memories are provided to eliminate the above-mentioned problem. Additionally, since the compressed binary image data is smaller in size than the original binary image data, the necessary memory capacity is not greatly increased. This is also an advantage achieved by extracting the black runs from the compressed binary image data.

After the compressed binary image data is stored in the compressed binary image memory 106, the compressed binary image data is scanned, in step S108, by a black run extracting unit 108 to extract a black run having a length longer than a predetermined length which has a higher possibility of being a ruled line. In step S110, the data including the coordinate values of the start point and end point of the extracted black run is stored in a black run memory 110. When a document containing both the horizontal and vertical ruled lines is processed, black runs corresponding to both the horizontal and vertical ruled lines are extracted. Both of the horizontal ruled lines and the vertical ruled lines can be extracted at the same time. However, in this embodiment, one of the horizontal ruled lines and vertical ruled lines is extracted and the image data corresponding to the extracted ruled lines is deleted. Thereafter, the other one of the horizontal ruled lines and the vertical ruled lines is extracted and the corresponding image data is deleted. It should be noted that when it is desired to delete only a line such as an underline parallel to a character row, only black runs parallel to the character row are extracted.

After the data (black run data) corresponding to the extracted black run is obtained, black run data corresponding to the black runs existing in a predetermined area is combined by a ruled line extracting unit 112, in step S112, into data corresponding to a rectangle (hereinafter referred to as a ruled line rectangle). Then, in step S114, the data of the ruled line rectangle is stored in a ruled line memory 114. The data stored in the ruled line memory 114 includes coordinate values of diagonal vertices of the ruled line rectangle and information for extracting the coordinate values of the black runs from the data stored in the black run memory 110.

After at least one ruled line rectangle is extracted, coordinate values of diagonal vertices of the ruled line rectangle are read from the ruled line memory 114. Additionally, coordinate values of the start point and end point of the black runs incorporated in the ruled line rectangle are read from the black run memory by referring to the data in the ruled line memory 114. In step S116, the coordinate values of the start and end points of the black runs, which are coordinate values of the compressed binary image, are converted, by a coordinate conversion unit 116, into coordinate values of the original binary image before compression.

Figure 6:
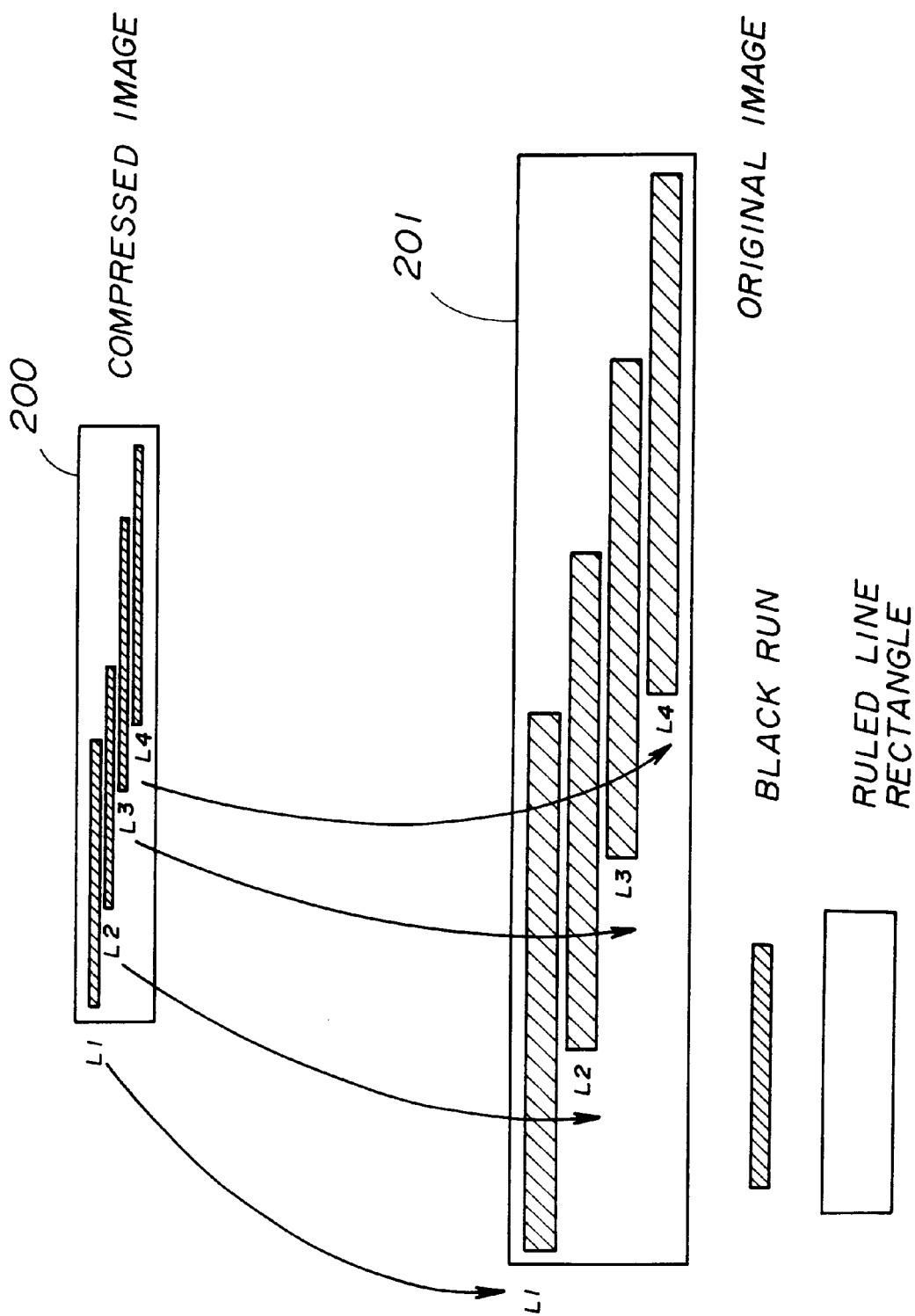
FIG. 6 is an illustration for explaining a conversion of compressed black runs.

FIG. 6 is an illustration for explaining the conversion of the coordinate values. In FIG. 6, a rectangle 200 is a ruled line rectangle in the compressed binary image, and a rectangle 201 is a ruled line rectangle in the original binary image which is converted from the rectangle 200. Four black runs L1, L2, L3 and L4 exist within the rectangle 200. Because the black runs in the compressed ruled line rectangle are compressed by the OR compression, contours of the black runs converted from the compressed black runs into the original binary image are slightly enlarged by an amount caused by the OR compression. Accordingly, if there is an interruption in a black run due to the resolution of the scanner or an error of binarization, the interruption will be eliminated because of the OR compression. Thus, in this embodiment, the compressed black run is converted into the original binary image without such an interruption.

After the compressed black runs are converted into the original binary image, black pixels in the black runs are changed by a ruled line deleting unit 118, in step S118, to white pixels by referring to the converted coordinate values. Thus, the ruled lines corresponding to the black runs are deleted from the original binary image. The deletion of the black runs can be performed under one of three modes described below.

1) Mode A: In this mode, a range of deletion directly corresponds to a range of a black run converted from the compressed black run. Since the black runs are enlarged due to the OR compression, the range of deletion of the black runs is slightly larger than that of the original binary image. Thus, if there is a small fluctuation in the original binary image or there is a small interruption in the ruled line, the ruled line can be positively deleted.

2) Mode B: In this mode, the range of deletion is increased by a predetermined width as compared to a range of the black run after being converted from the compressed black run. This ensures the deletion of ruled lines when fluctuation of an image corresponding to a ruled line is large.

3) Mode C: In this mode, the range of deletion is increased by a predetermined ratio, for example, one-fourth of the ruled line rectangle. When the amount of increase is fixed as is in the mode B, if the amount of increase is insufficiently small, the influence of the image fluctuation cannot be completely eliminated. On the contrary, if the amount of increase is too much, black pixels contained in a character adjacent to the ruled line may be deleted. Thus, the determination of the amount of increase in the range of deletion is very difficult. However, in the mode C, the amount of increase of the range of the ruled line is determined based on a magnitude of the fluctuation which is proportional to the width of the ruled line. Thus, the increase in the range of deletion is appropriately adjusted based on the width of the ruled line to be deleted.

After completion of the extraction of the black runs, the extraction of the ruled line rectangle and the deletion of the ruled lines in a desired direction, a character image is extracted by a character extracting unit 120, in step S120, from the binary image data stored in the binary image memory 102. Then, in step S122, a character recognition process is performed by a character recognition unit 122 based on the extracted character image. The character recognition process can be performed by using a conventional method such as a method using a projection of characters or a method using extraction and integration of black runs.

In this embodiment, since the ruled lines, which are obstacles in the character recognition process, are previously eliminated from the original image data, an accurate character recognition can be achieved. Thus, characters in a ruled area or characters having an underline can be accurately recognized.

Figure 7:
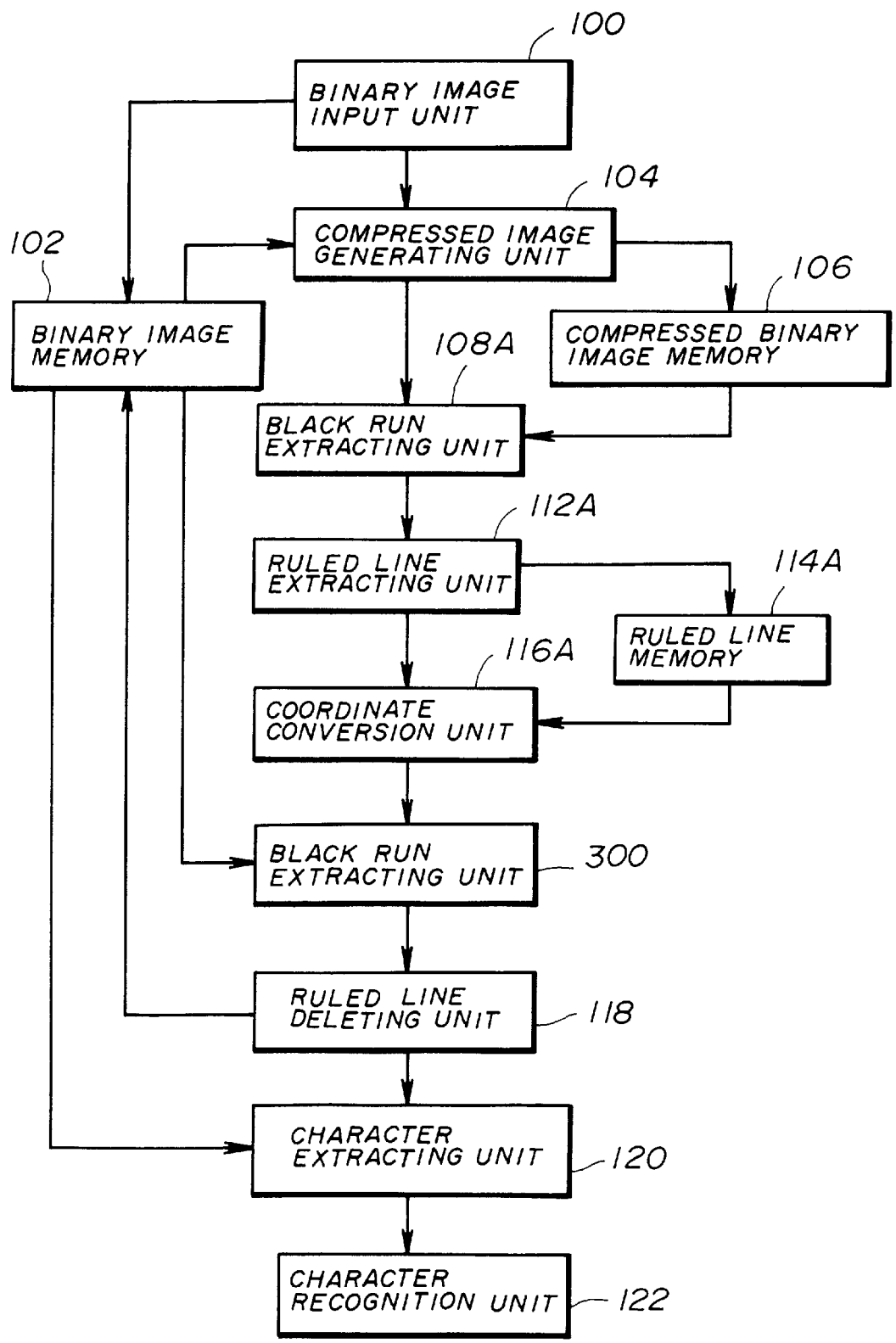
FIG. 7 is a block diagram of a character recognition system which uses a second embodiment of the character recognition method according to the present invention.
Figure 8:
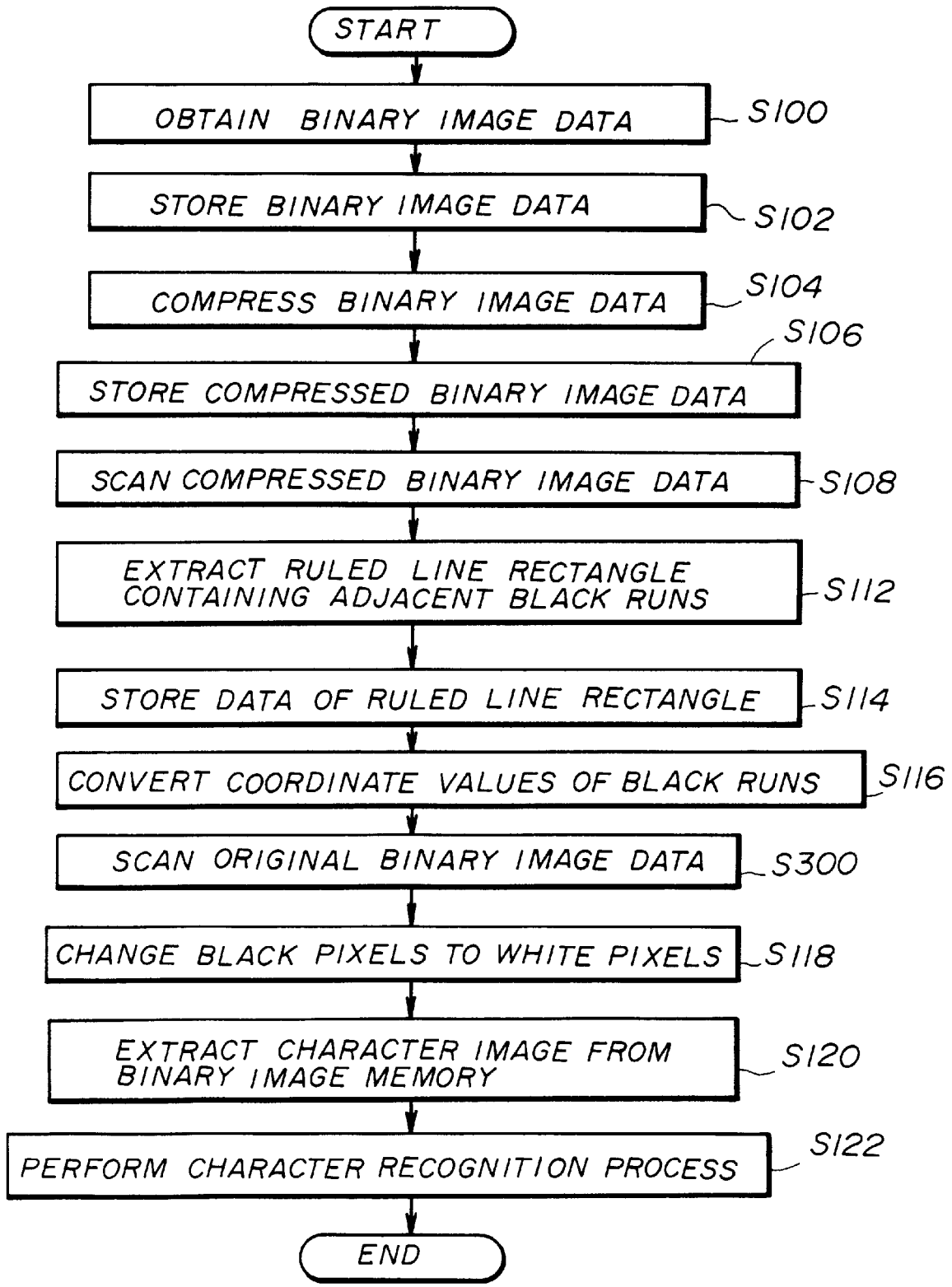
FIG. 8 is a flowchart of a character recognition process performed by the character recognition system shown in FIG. 7.

A description will now be given, with reference to FIGS. 7 and 8, of a second embodiment of the character recognition method according to the present invention. FIG. 7 is a block diagram of a character recognition system which uses the second embodiment of the character recognition method according to the present invention. FIG. 8 is a flowchart of a character recognition process performed by the character recognition system shown in FIG. 7. The second embodiment of the character recognition method is different from the first embodiment in that a step for storing the black run data in the black run memory is eliminated, and, instead, another step for extracting the black runs is added. In FIGS. 7 and 8, parts and steps that are the same as the parts and steps shown in FIGS. 4 and 5 are given the same reference numerals or step numbers, and descriptions thereof will be omitted.

When the process shown in FIG. 8 is started, the binary image data is stored in the binary image memory 102, similar to the first embodiment. In step S108A, the black runs having a predetermined length are extracted by a black run extracting unit 108A. Unlike the first embodiment, the extracted black runs are not stored, and step S112A is performed immediately after the black runs having the predetermined length are extracted. In step S112A, the black runs within a predetermined distance are selected, by a ruled line extracting unit 112A, as they form a ruled line rectangle. Then, in step S114A, the data of the ruled line rectangle is stored in the ruled line memory 114A. Since there is no black run memory as is provided in the first embodiment, coordinate values of only two diagonal vertices are stored in the ruled line memory 114. That is, the data stored in the ruled line memory 114 does not include information for referring to the black runs. Then, in step S116A, the coordinate values of the two diagonal vertices are converted by a coordinate conversion unit 116A into the coordinate values of the original binary image data before compression. Since the coordinate values of the two diagonal vertices are ones for the compressed binary image, the coordinate values are converted into the coordinate values of the original binary image data, and then the routine proceeds to step S300 to delete the ruled lines.

In step S300, the range of the ruled line rectangle in the original binary image data of the binary image memory 102 is scanned by another black run extracting unit 300 so as to extract black runs having the predetermined length. Then in step S118, the deletion of the ruled lines is performed on the binary image data in the binary image memory 102 based on the coordinate values of the extracted black runs. The deletion of the black runs is the same as that of the first embodiment.

As mentioned above, in the present embodiment, the deletion of ruled lines is performed without using a memory for storing the data of the black runs. This method is advantageous for a case in which a personal computer having a memory with a small capacity is used for preforming the character recognition method according to the present invention.

After the deletion of ruled lines is completed, the routine proceeds to step S120 so as to extract the character image within the ruled lines, and then the routine proceeds to step S122 to recognize the characters contained in the extracted character image.

Figure 9:
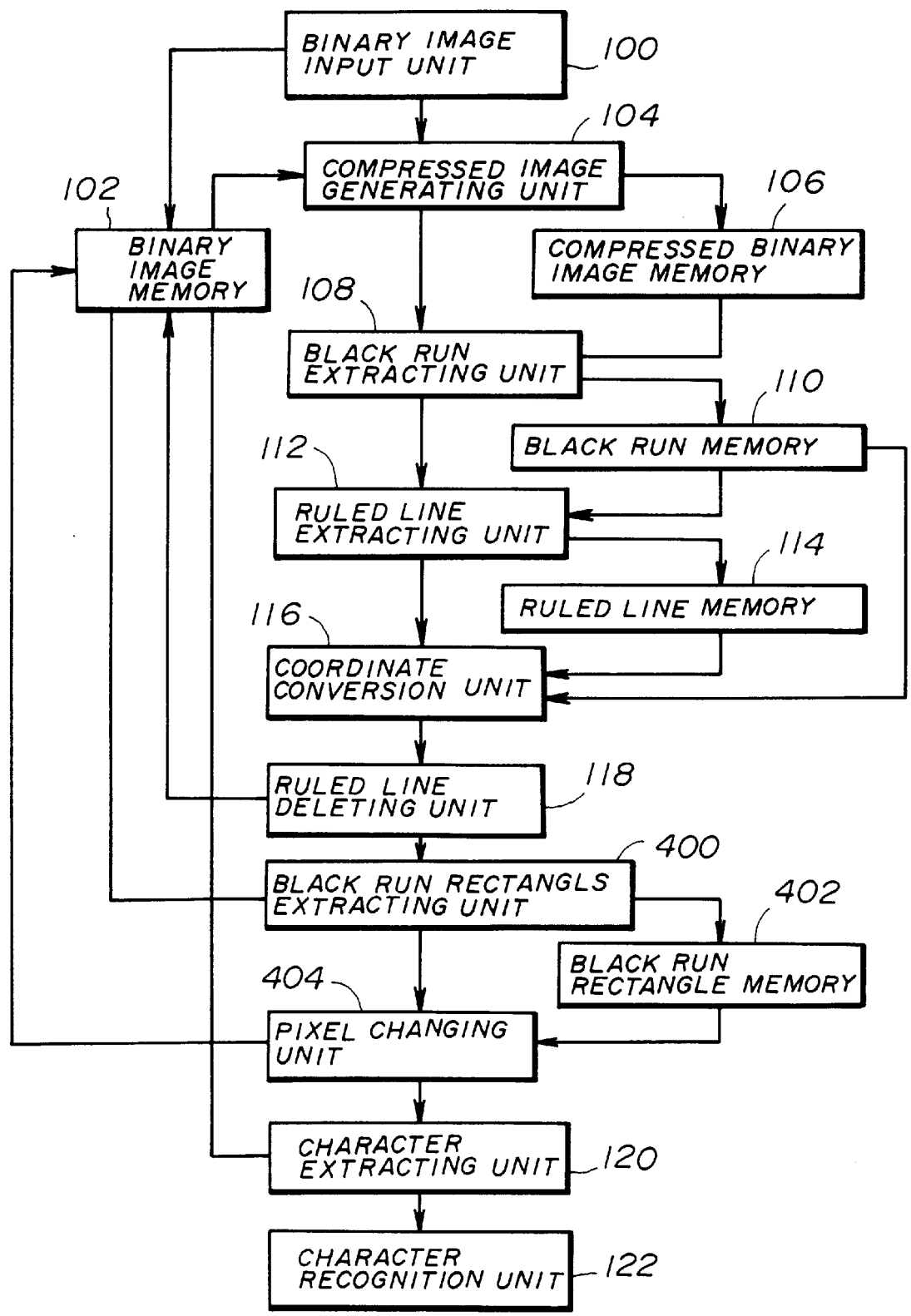
FIG. 9 is a block diagram of a character recognition system which uses a third embodiment of the character recognition method according to the present invention.
Figure 10:
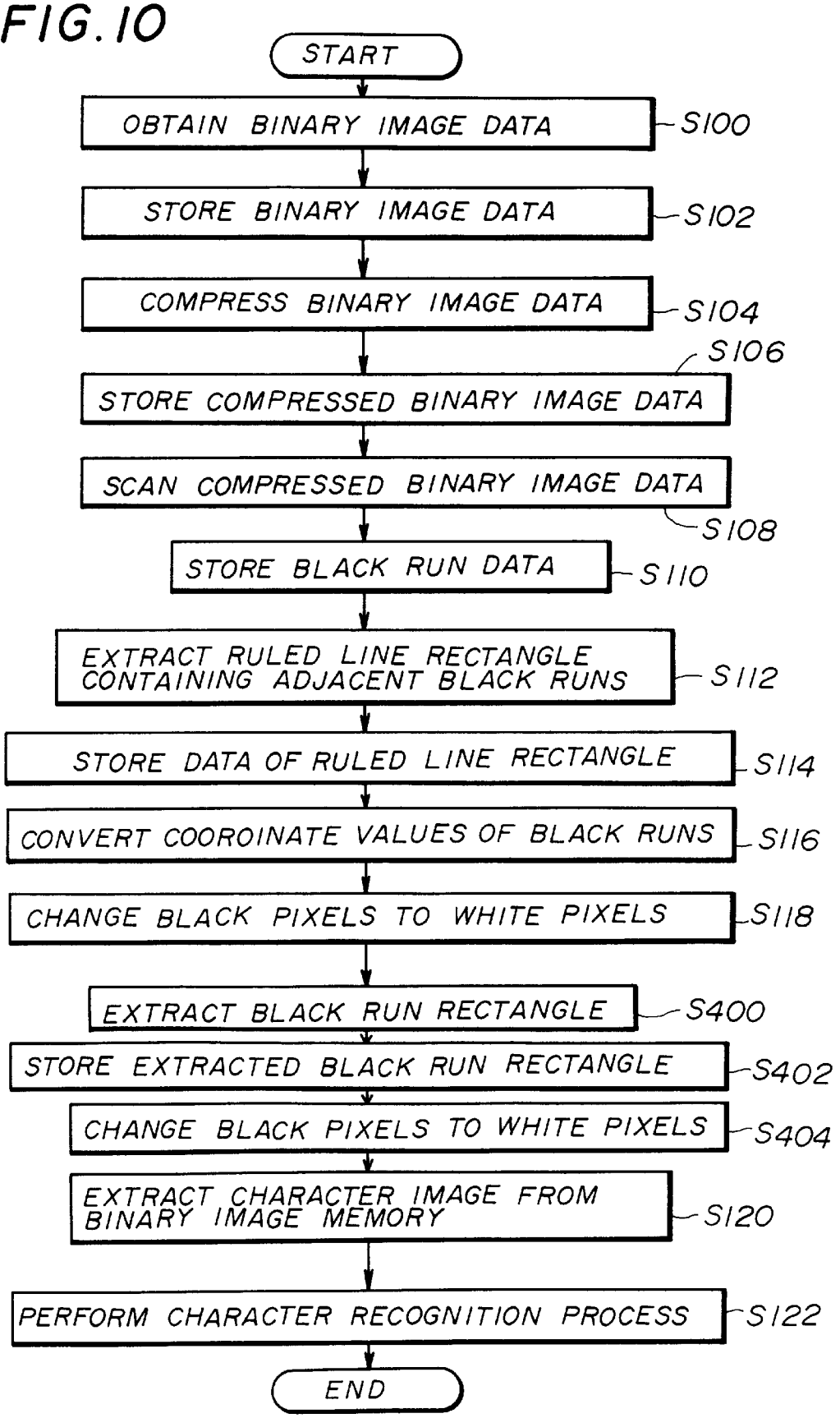
FIG. 10 is a flowchart of a character recognition process performed by the character recognition system shown in FIG. 9.

A description will now be given, with reference to FIGS. 9 and 10, of a third embodiment of the character recognition method according to the present invention. FIG. 9 is a block diagram of a character recognition system which uses the third embodiment of the character recognition method according to the present invention. FIG. 10 is a flowchart of a character recognition process performed by the character recognition system shown in FIG. 9. In FIGS. 9 and 10, parts and steps that are the same as the parts and steps shown in FIGS. 4 and 5 are given the same reference numerals or step numbers, and descriptions thereof will be omitted. In this embodiment, the ruled line deleting unit 118 deletes the ruled lines under the mode A described with respect to the first embodiment. That is, only black pixels contained in the black runs corresponding to the range of the converted black runs representing the ruled lines are changed to white pixels. Accordingly, the flowchart of the present embodiment shown in FIG. 10 is the same as that of the first embodiment shown in FIG. 5 except for steps 400–404 added between steps 118 and 120.

When the process shown in FIG. 10 is started, steps S100 to S118 are performed similar to the first embodiment. After the black pixels corresponding to the ruled lines are deleted in step S118, the routine proceeds to step S400. In step S400, a black run rectangle extracting unit 400 scans the binary image data in the binary image memory 102, from which the ruled lines have been deleted by the ruled line deleting unit 118, so as to extract black run rectangles which are isolated and are smaller than a predetermined size, the area scanned by the black run rectangle extracting unit 400 being an area within a predetermined distance from the deleted black runs. The black run rectangle is obtained as a rectangle similar to the ruled line rectangle. Then, in step S402, the diagonal vertices of the extracted ruled line rectangle are stored in a black run rectangle memory 402. Thereafter, in step S404, a pixel changing unit 404 changes the black runs contained in a rectangle in the binary image data which corresponds to the extracted black run rectangle to white pixels by referring to the data in the black run rectangle memory 402.

Figure 11:
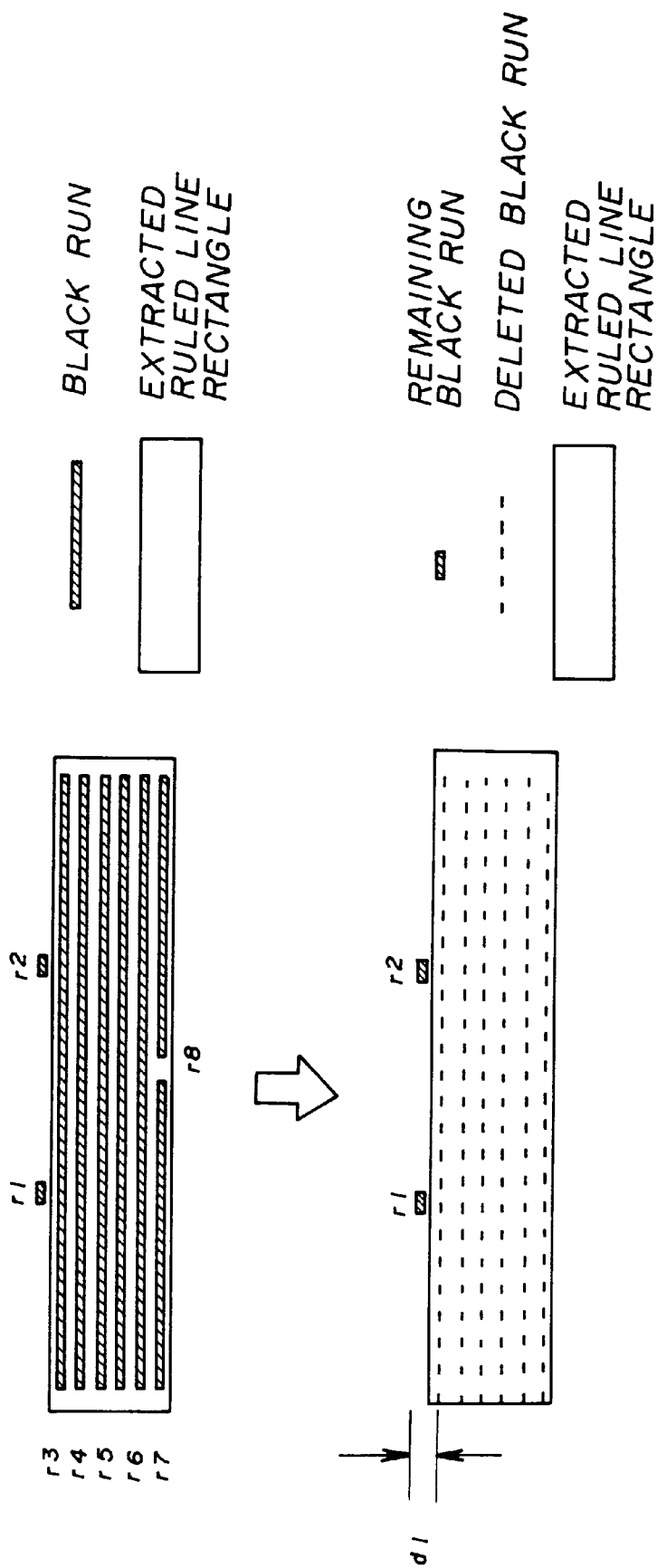
FIG. 11 is an illustration for explaining deletion of a black run rectangle adjacent to a ruled line rectangle.

According to the extraction of the black run rectangle and the change of the black pixels contained in the extracted black run rectangle to white pixels, black pixels, which are generated due to image fluctuation and cannot be eliminated by the deletion of the ruled lines by merely changing the black pixels contained in the ruled line rectangle to white pixels, can be positively eliminated. FIG. 11 is an illustration for explaining the deletion of the black run rectangle adjacent to the ruled line rectangle. FIG. 11-(a) illustrates a ruled line rectangle and two black runs (can be black run rectangles) r1 and r2 adjacent to the ruled line rectangle are shown. The black runs r1 and r2 were generated due to the image fluctuation. The ruled line rectangle contains black runs r3, r4, r5, r6, r7 and r8. FIG. 11-(b) illustrates a result of the deletion of the black runs contained in the ruled line rectangle. As shown in FIG. 11-(b), the black runs r1 and r2 which are generated due to the image fluctuation remain undeleted. These remaining black runs r1 and r2 can be deleted by detecting black runs within a predetermined distance d1 from the extracted ruled line rectangle.

In the mode B or C described with respect to the first embodiment, since black pixels corresponding to all black runs within a predetermined area are changed to white runs, there is a possibility that black pixels corresponding to a portion of character image are undesirably changed to white pixels. However, in the present invention, since only a small black run or black run rectangle is extracted and deleted, only a black run or black run rectangle generated due to image fluctuation can be positively deleted, resulting in prevention of deletion of black runs which should not be deleted.

After the deletion of ruled lines and the small black runs, a character recognition process is performed, similar to the first embodiment, on the binary imaged data from which the ruled lines are eliminated.

It should be noted that, in the present embodiment, the extraction of the black runs may be performed without storing the data of the ruled line rectangle in the black run memory 110 as is in the second embodiment.

Figure 12:
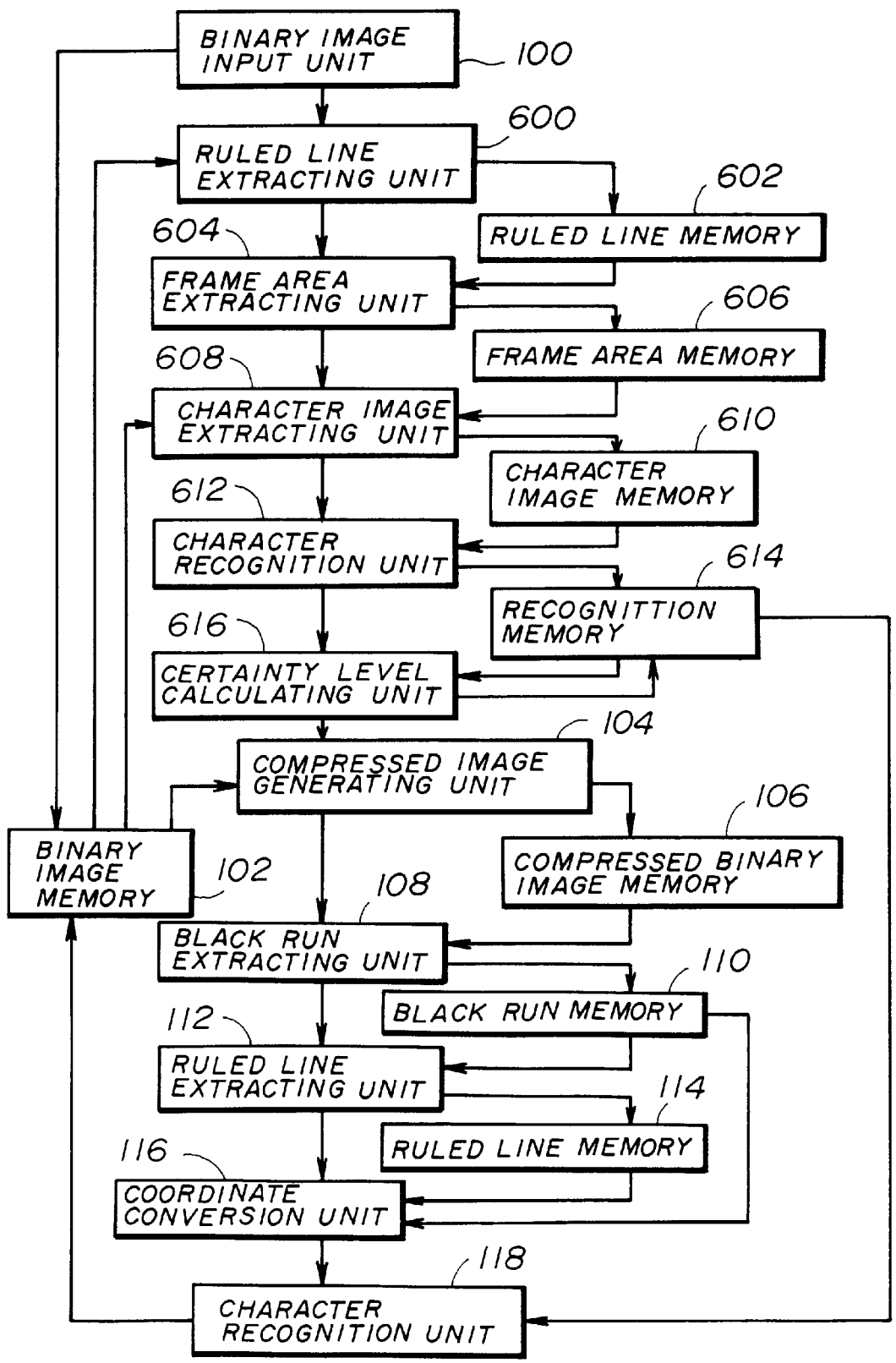
FIG. 12 is a block diagram of a character recognition system which uses a fourth embodiment of the character recognition method according to the present invention.
Figure 13A:
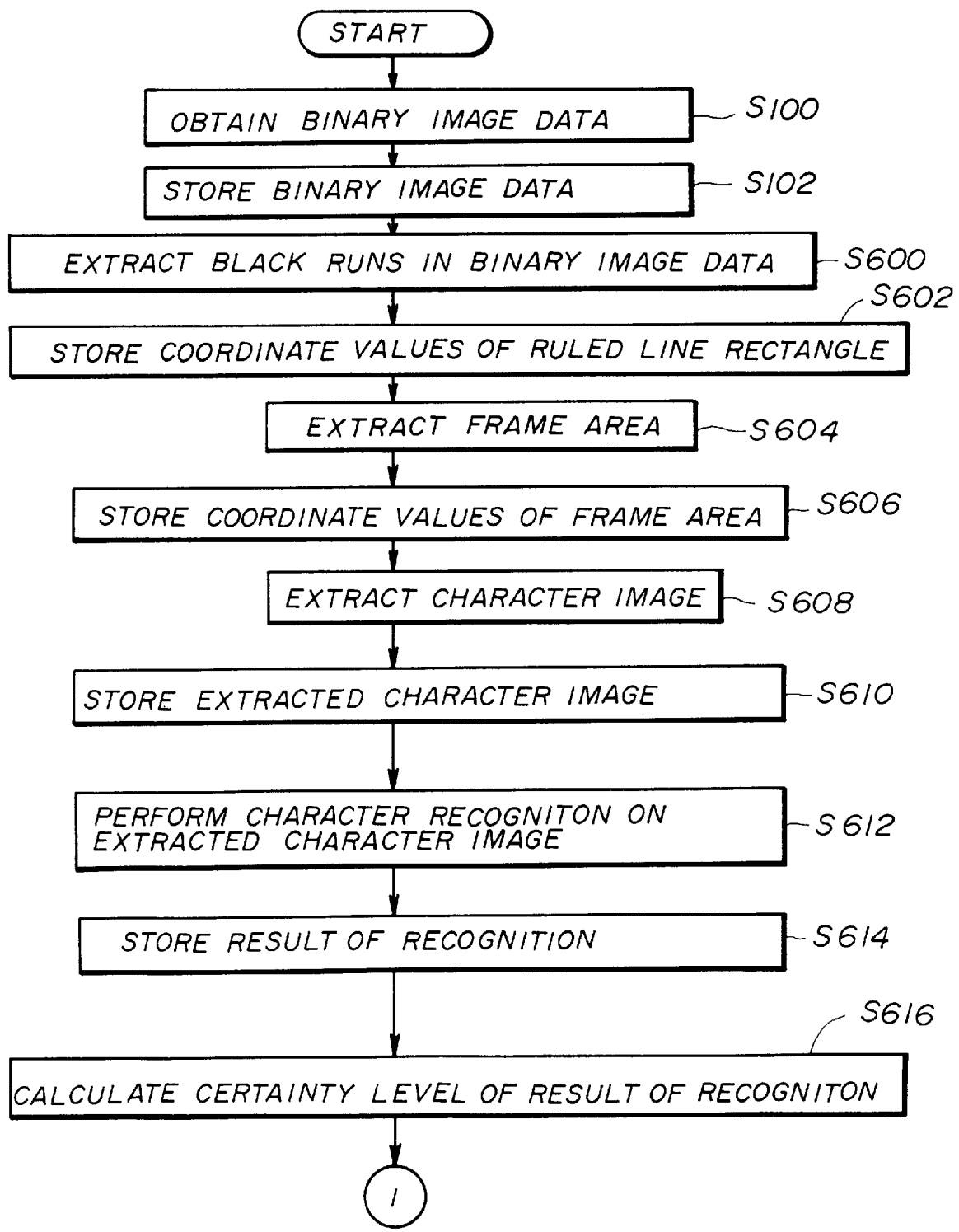
FIGS. 13A and 13B are parts of a flowchart of a character recognition process performed by the character recognition system shown in FIG. 12.
Figure 13B:
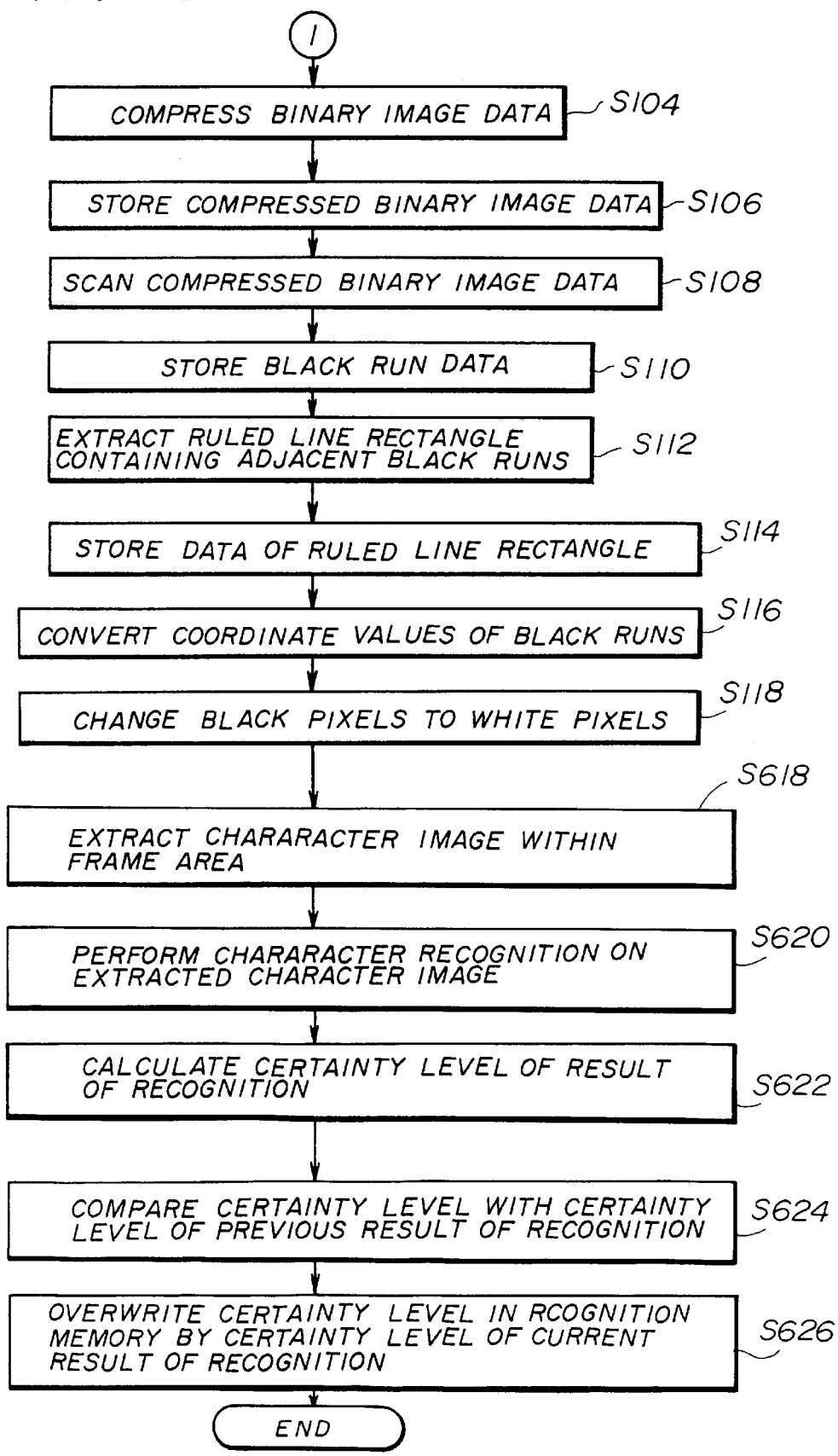

A description will now be given, with reference to FIGS. 12, 13A and 13B, of a fourth embodiment of the character recognition method according to the present invention. FIG. 12 is a block diagram of a character recognition system which uses the fourth embodiment of the character recognition method according to the present invention. FIGS. 13A and 13B are parts of a flowchart of a character recognition process performed by the character recognition system shown in FIG. 12. In FIGS. 12, 13A and 13B, parts and steps that are the same as the parts and steps shown in FIGS. 4 and 5 are given the same reference numerals or step numbers, and descriptions thereof will be omitted.

In this embodiment, after the binary image data is stored in the binary image memory 102, the routine proceeds to step S600 shown in FIG. 13A. The binary image data in the binary image memory 102 is scanned, in step S600, by a ruled line extracting unit 600 to extract black runs having a length longer than a predetermined length in the primary and secondary directions. The extracted black runs within a predetermined distance in each direction are combined to form a ruled line rectangle. In step S602, the data including the coordinate values of the diagonal vertices of each ruled line rectangle is stored in a ruled line memory 602. Then, in step S604, a frame area extracting unit 604 extracts a frame area surrounded by the ruled lines in the primary and secondary directions by referring to the data of the ruled line rectangles stored in the ruled line memory 602. The extraction is made based on the outer sides of the frame area which are defined by two horizontal ruled line rectangles and two vertical ruled line rectangles. In step S606, the coordinate values of the diagonal vertices of the frame area are stored in a frame area memory 606. The process for recognizing the frame area will be described later.

After the coordinate values are stored in the frame area memory 606, a character recognition process is performed for a character image within the frame area. That is, a character image is extracted, in step S608, from each frame area by a character image extracting unit 600. In step S610, the extracted character image is stored in a character image memory 610. The character image can be extracted by scanning image data corresponding to the frame area. Black runs extracted by the scanning are combined so as to recognize characters formed by the black runs. At this time, as described below, black runs intruding from an exterior of the frame area may be eliminated. Alternatively, a character image area may be extracted by taking a projection of an image within the frame area in a direction perpendicular to the direction along the character row.

Thereafter, in step S612, a character recognition process such as extraction of features and determination of matching of the extracted features with a recognition dictionary is performed by a character recognition unit 612. In step S614, the result of recognition and evaluation thereof is stored in a recognition memory 614. Then, in step S616, a certainty level of the result of recognition is calculated by a certainty level calculating unit 616. The calculated certainty level is stored in the recognition memory 614. Calculation of certainty level is known in the art, and therefore a description thereof will be omitted. It should be noted that although the result of evaluation is based on information corresponding to each character, since the result of evaluation is a kind of certainty level, the result of evaluation may possibly be used as the final certainty level in the present embodiment.

In the present embodiment, if the certainty level of the result of recognition for each character is higher than a predetermined level, the process (ruled line deleting process) for deleting the ruled lines mentioned below is not necessarily performed. However, the ruled line deleting process may be performed without considering the certainty level. The ruled line deleting process is performed whenever the certainty level of at least one character in the frame area is lower than the predetermined level.

The ruled line deleting process corresponds to the process performed in steps S104 through S118 of the first embodiment described above. Alternatively, the process described in the second embodiment or the third embodiment may be used. Additionally, the ruled line deleting process may be applied to an area related to a frame area containing a character having a low certainty level.

After the process of step S118 is performed and the binary image data having no ruled lines is stored in the binary image memory 102, the character image extracting unit 608 extracts, in step S618 shown in FIG. 13B, the character image within the frame area in which a character having a low certainty level was contained. In step S620, the character recognition process is performed on the extracted character image again by the character recognition unit 612, and then the calculation of the certainty level is performed, in step S622, on the result of recognition. In step S624, the character recognition unit 612 compares the certainty level with the previous certainty level stored in the recognition memory 614 so as to overwrite the result of recognition, in step S626, by the present result of recognition when the certainty level of the present result of recognition is higher than the certainty level of the previous result of recognition.

As mentioned above, in the present embodiment, when the result of recognition obtained from the binary image data which has ruled lines is low, the character image within at least a frame area containing a character having a low certainty level is recognized again with the binary image data from which ruled lines are eliminated. Thus, an accurate recognition of the document containing ruled lines can be achieved.

Figure 14:
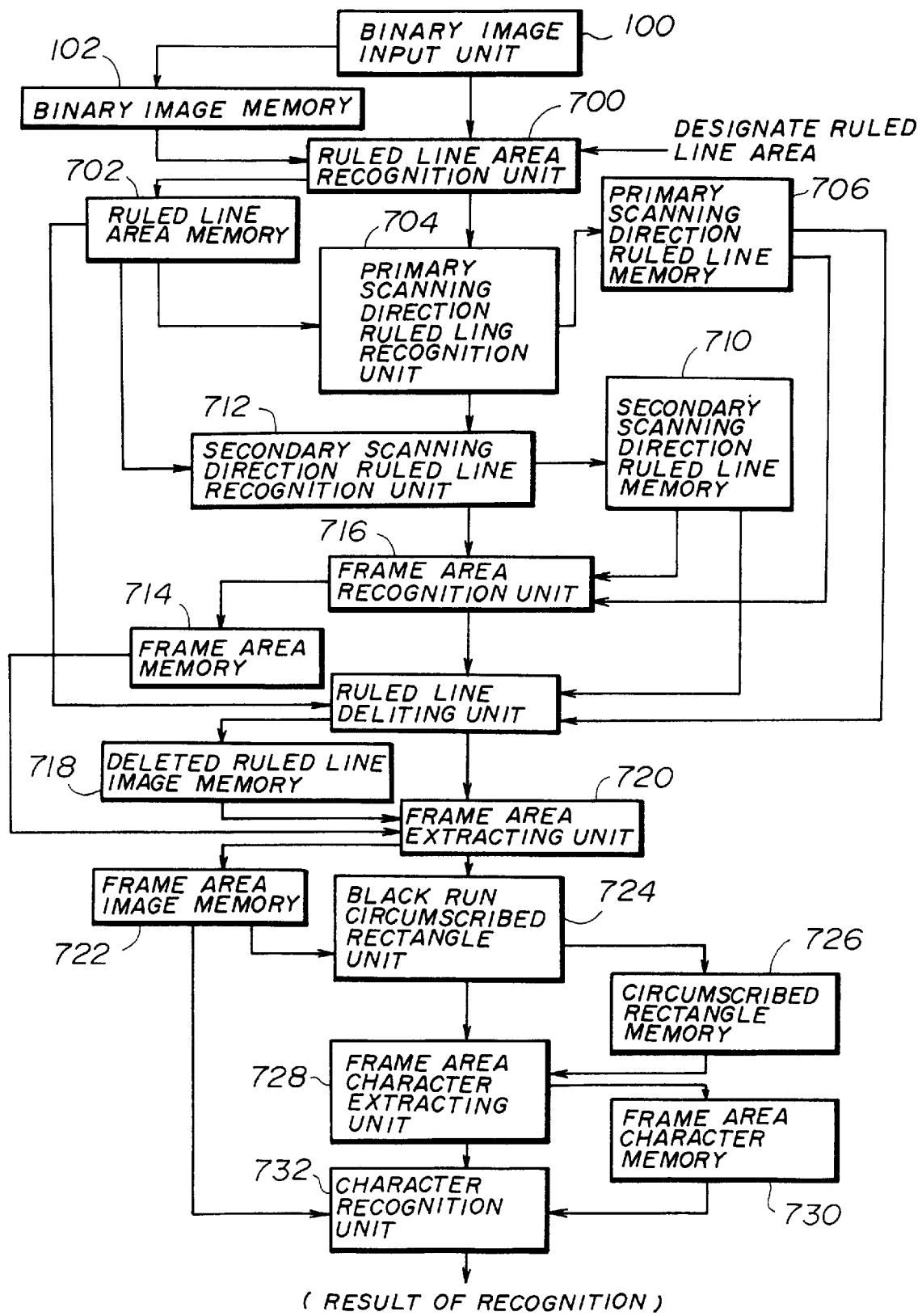
FIG. 14 is a block diagram of a character recognition system which uses a fifth embodiment of the character recognition method according to the present invention.
Figure 15:
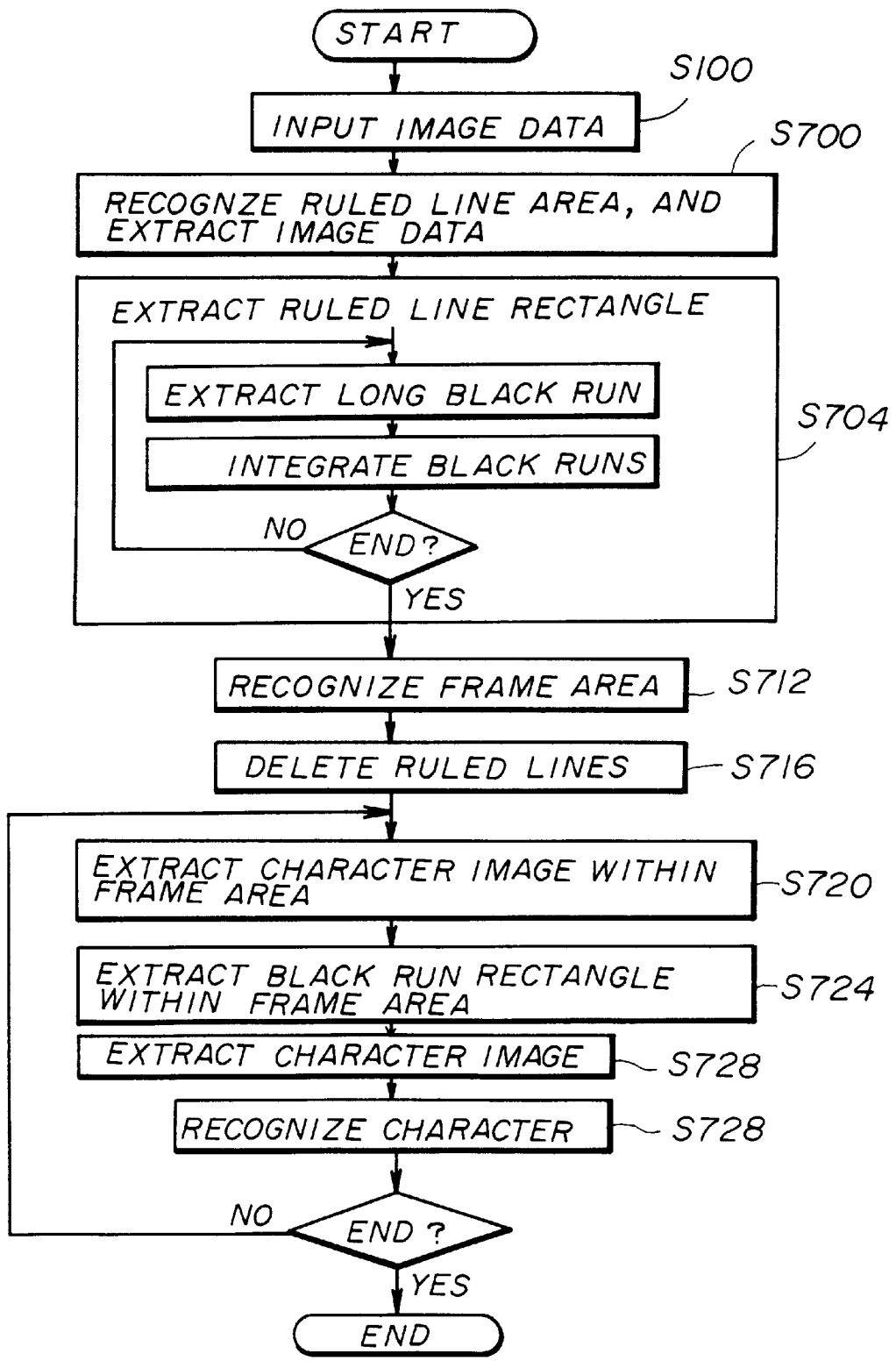
FIG. 15 is a flowchart of a character recognition process performed by the character recognition system shown in FIG. 14.

A description will now be given, with reference to FIGS. 14 and 15, of a fifth embodiment of the character recognition method according to the present invention. FIG. 14 is a block diagram of a character recognition system which uses the fifth embodiment of the character recognition method according to the present invention. FIG. 15 is a flowchart of the character recognition process performed by the character recognition system shown in FIG. 14.

When the process shown in FIG. 15 is started, binary image data is input, in step S100, by scanning a document by the binary image input unit 100. The binary image data is stored in the binary image memory 102.

Thereafter, the routine proceeds to step S700. In step S700, a ruled line area recognition unit 700 recognizes a ruled line area which contains ruled lines and character images surrounded by the ruled lines. Then, the image data of the recognized ruled line area is stored in a ruled line area memory 702. The recognition of the ruled line area may be performed automatically based on a run-length distribution. Alternatively, the ruled line area can be designated by a user with a pointing device such as a mouse.

Figure 1:
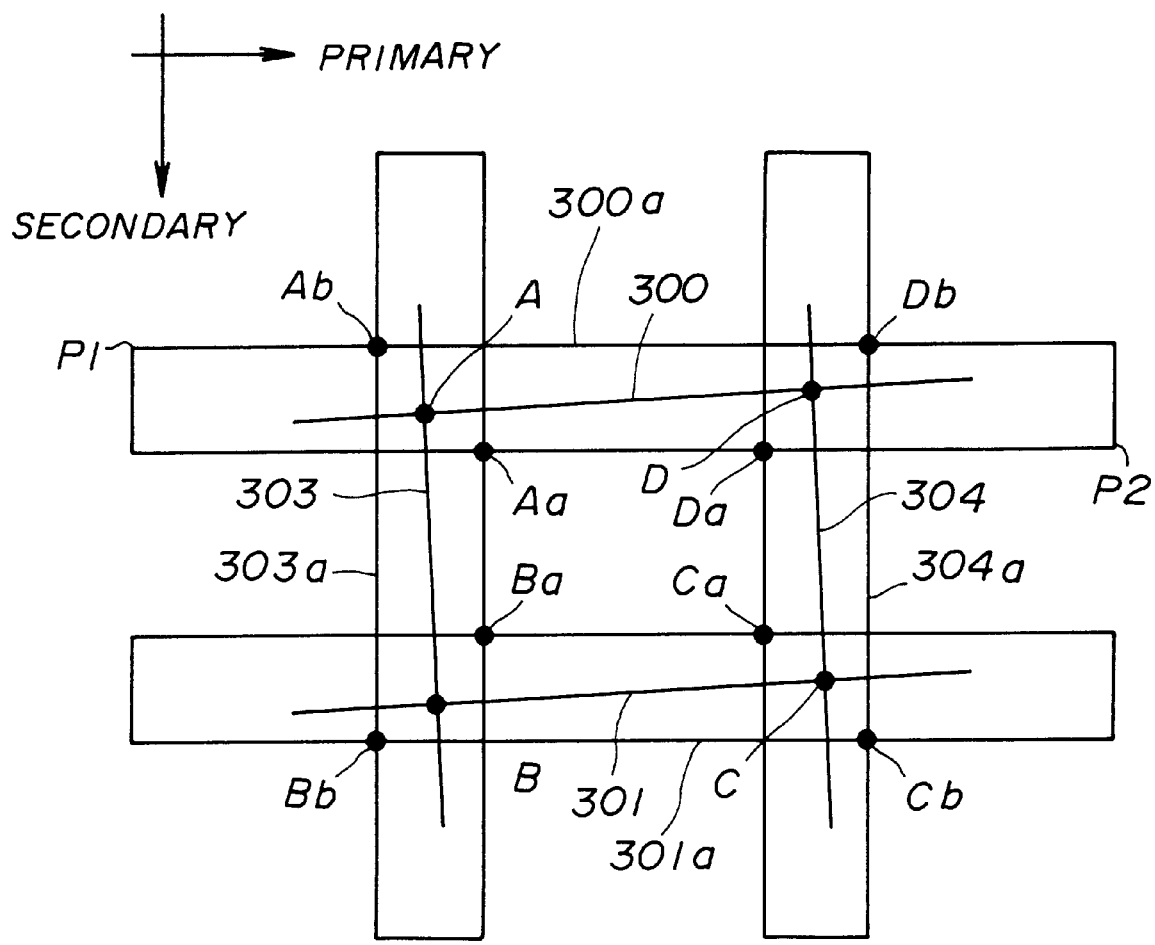
FIG. 1 is an illustration of a ruled area defined by horizontal ruled lines and vertical ruled lines.

Then, the routine proceeds to step S704 so as to extract ruled line rectangles from the image data stored in the ruled line area memory 702. Specifically, a primary scanning direction ruled line recognition unit 704 extracts ruled line rectangles corresponding to the ruled lines in the primary scanning direction, and secondary scanning direction ruled line recognition unit 708 extracts ruled line rectangles corresponding to the ruled lines in the secondary scanning direction. The coordinate values of two diagonal vertices of each of the ruled line rectangles along the primary scanning direction, such as coordinate values of vertices P1 and P2 of a ruled line rectangle 300a shown in FIG. 1, are stored in a primary scanning direction ruled line memory 706. The coordinate values of two diagonal vertices of each of the ruled line rectangles along the secondary scanning direction are stored in a secondary scanning direction ruled line memory 710. More specifically, in step S704, black runs having lengths more than a predetermined length in either the primary scanning direction or the secondary scanning direction are extracted by scanning the image data in the ruled line area memory 702. The extracted black runs within a predetermined short distance from each other are combined, and a ruled line rectangle is extracted based on the combined black runs as a rectangle containing all the combined black runs. In the present embodiment, information of each black run, such as coordinate values of the start and end points of each black run, is stored in the primary scanning direction ruled line memory 706 and the secondary scanning direction ruled line memory 710.

In step S712, a frame area recognition unit 712 recognizes a frame area defined by ruled line rectangles in the primary and secondary directions by referring to the data in the primary and secondary scanning direction ruled line memories 706 and 710. The coordinate values of the diagonal vertices of the recognized frame area are stored in a frame area memory 714. The recognition of the frame area is based on outer sides of each of the ruled line rectangles defining the frame area. That is, in FIG. 1, a frame area defined by ruled lines 300, 301, 303 and 304 is recognized as a rectangle Ab-Bb-Cb-Db defined by the outer sides of the ruled line rectangles 300a, 301a, 303a and 304a.

Then, in step S716, a ruled line deleting unit 716 reads the image data from the ruled line area memory 702. The image data is processed so that black pixels corresponding to the ruled lines recognized by referring to the black run information stored in the primary and secondary scanning direction ruled line memories 706 and 710 are changed to white pixels. Thereby, the image data is produced in which the ruled lines in the ruled line area are eliminated. The imaged data having no ruled lines is stored in a deleted ruled line image memory 718.

In order to reduce the size of memories 706 and 710, the information of the black runs having more than the predetermined length may not be stored in the primary and secondary scanning direction ruled line memories 706 and 710. Instead of that, in step S716, the ruled line deleting unit 716 scans the image data of each of the ruled line rectangles so as to extract the long black runs by referring to the information of the ruled line rectangles stored in the primary and secondary scanning direction ruled line memories 706 and 710. The image data from which the ruled lines are deleted is produced by changing the black pixels corresponding to the extracted long black runs to white pixels.

In step S720, image data in one of the frames is extracted by a frame area extending unit 720 from the deleted ruled line image memory 718 by referring to the information off the frame area stored in the frame area memory 714. The extracted image data is stored in a frame area image memory 722. Then, in step S724, a black run circumscribed rectangle extracting unit 724 scans the image data in the frame area image memory 722 so as to extract a block of black runs as a circumscribed rectangle thereof. The coordinate values of diagonal vertices of the circumscribed rectangle are stored in a circumscribed rectangle memory 726. Then, in step S728, a frame area character extracting unit 728 performs a necessary integration of the black run circumscribed rectangles so as to extract a character area as a rectangular area by referring to the information of the black run circumscribed rectangle stored in the circumscribed rectangle memory 726. The coordinate values of the rectangle corresponding to the character area are stored in a frame area character memory 730. In step S732, a character recognition unit 732 performs a character recognition on the character image data extracted from the frame area image data stored in the frame area image memory 722 by referring to the information of the character area stored in the frame area character memory 730. The result of recognition is then output to an external device. It is then determined whether or not the frame area to be recognized is ended. If another frame area to be recognized remains, the routine returns to step S720. Otherwise, the routine is ended.

In the present embodiment, since the image data of the entire ruled line area is stored in the deleted ruled line image memory 718 in step S716, the size of the memory 718 must be substantially equal to the size of the binary image memory 102 when the entire area of the document to be processed is a ruled line area.

In order to reduce the size of the deleted ruled line image memory 718, the image data corresponding to one of the frame areas may be stored in the deleted ruled line image memory 718, and the character recognition process is immediately performed on the character image data stored in the deleted ruled line image memory 718. This may reduce the size of the deleted ruled line image memory 718 to a size sufficient for storing image data contained in only one frame area. As a result, the process of step S724 is not necessarily performed. Thus, the frame area character memory 730 can be eliminated. In such a construction, the black run circumscribed rectangle extracting unit 724 and the character recognition unit 732 process the image data in the deleted ruled line image memory 718.

Figure 16A:
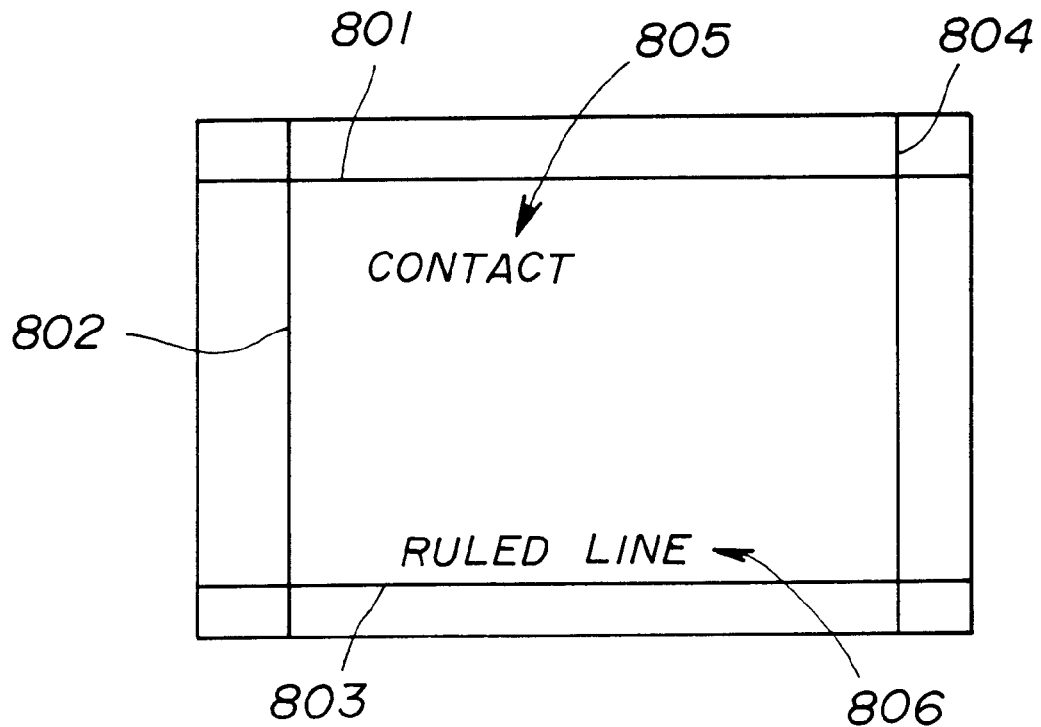
FIG. 16A is an illustration for explaining a frame area image.
Figure 16B:
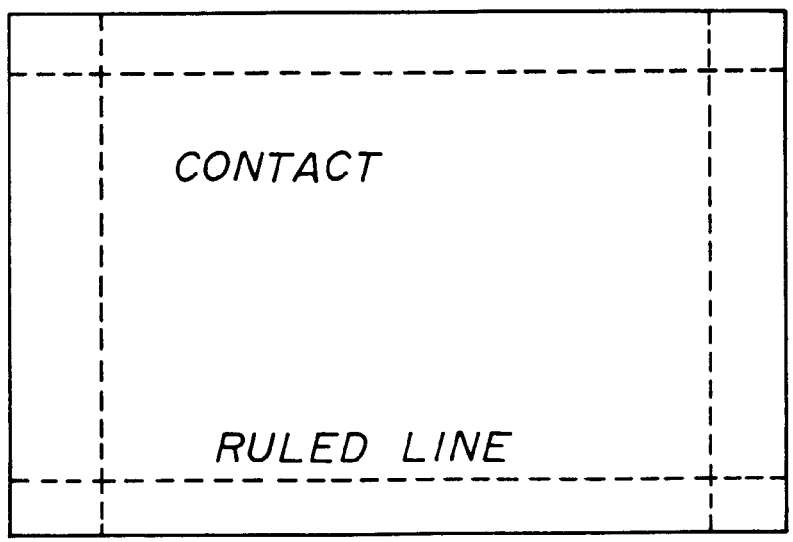
FIG. 16B is an illustration of a frame area image from which ruled lines are eliminated.

A description will now be given, with reference to FIGS. 16A and 16B, of an advantage of the present embodiment. It is supposed that a character strings 805 and 806 are located in a frame area encircled by ruled lines 801, 802, 803 and 804 as shown in FIG. 16A. The character string 805 is "CONTACT", and the character string 806 is "RULED LINE". The character string 806 contacts or is very close to the ruled line 803. If the character string 806 contacts the ruled line 803, the black run rectangles of each of the characters contained in the character string 806 and the ruled line rectangle of the ruled line 803 are extracted in an integrated form in the conventional method. Thus, in such a case, the conventional method cannot recognize each of the characters contained in the character string 806. Additionally, when the character string 806 is separated from the ruled line 803 but is very close to the ruled line 803, and if the entire image is inclined with respect to the primary scanning direction, the black run rectangles of each of the characters contained in the character string 806 and the ruled line rectangle of the ruled line 803 are also extracted in an integrated form in the conventional method. On the other hand, according to the present embodiment, since the black runs within the frame area are extracted after the ruled lines 801, 802, 803 and 804 are deleted as shown in FIG. 16B, the black runs in the frame area can be extracted without being influenced by the ruled lines. Thus, an accurate character recognition can be achieved.

Figure 17:
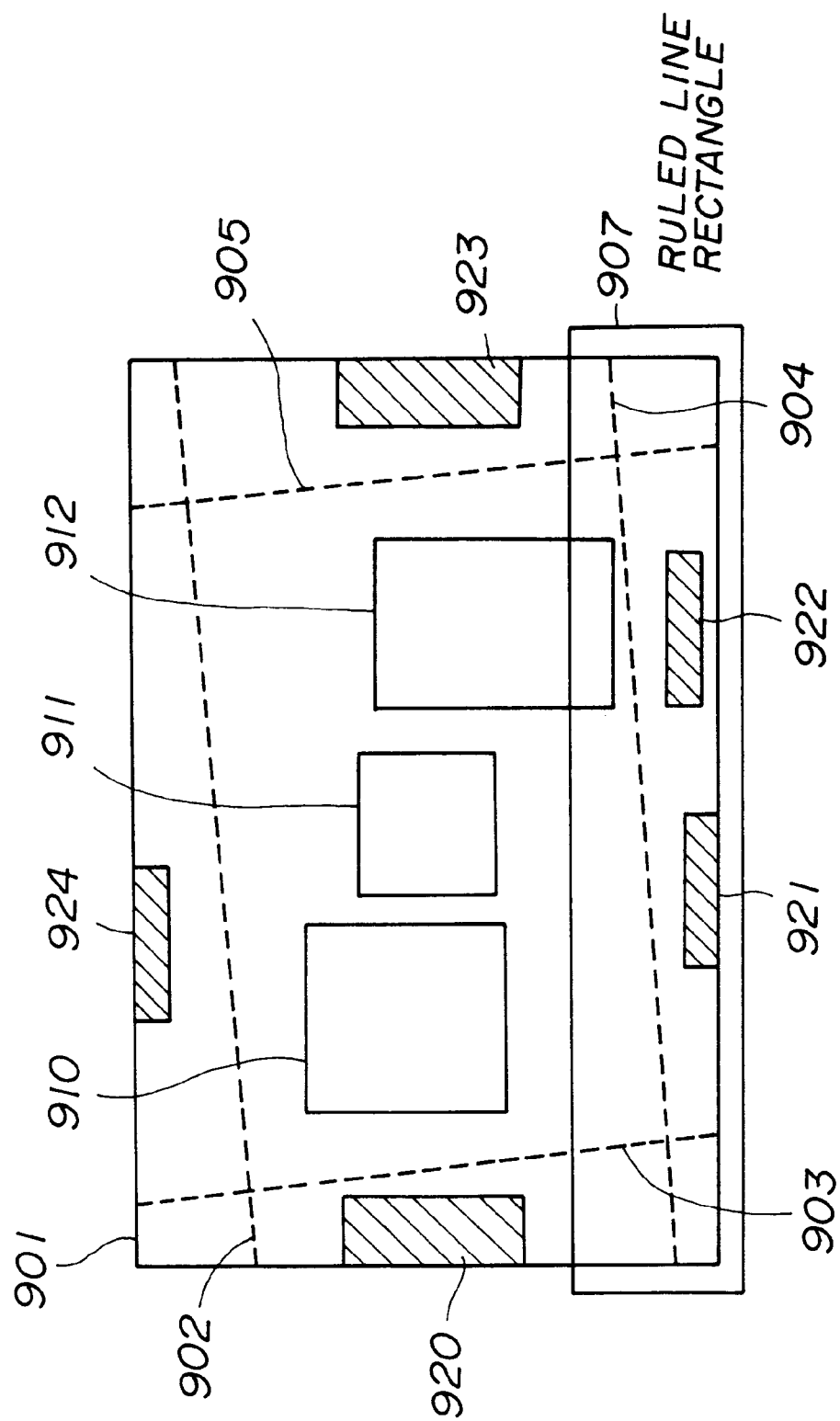
FIG. 17 is an illustration for explaining a case where a frame area is inclined with respect to the primary scanning line.

FIG. 17 is an illustration for explaining a case where a frame area is inclined with respect to the primary scanning line. In FIG. 17, a frame area 901 is recognized by the frame area recognition unit 712. The frame area 901 is recognized as a frame area encircled by ruled lines 902, 903, 904 and 905. Since the frame area 901 is recognized by using outer sides of ruled line rectangles corresponding to the ruled lines 902, 903, 904 and 905, a width of each of the ruled line rectangles is increased as compared to a width of each of the actual ruled line rectangles. Thus, there is a possibility that a black run of an adjacent frame area intrudes into the frame area 901 which is stored in the frame area image memory 722. Accordingly, there is a possibility that a circumscribed rectangle of the black runs intruding from outside of the frame area is included in the result of extraction of the black run circumscribed rectangle in the frame area image. In FIG. 17, black run rectangles 910, 911 and 912 are rectangles which actually exist within the frame area 901. However, black run rectangles 920, 921, 922, 923 and 924 are rectangles of adjacent frame areas.

In the present embodiment, first the black run rectangles 920, 921, 923 and 924, which circumscribe the frame area, are eliminated as they intrude from outside of the frame area 901. That is, the information of the black run rectangles 920, 921, 923 and 924 is not stored in the circumscribed rectangle memory 726. Then, the black run rectangle 922, which does not circumscribe but is completely included in the ruled line rectangle 907, is eliminated as a black run rectangle intruding from outside of the frame area 901. It should be noted that the eliminated black run rectangles are recognized as black run rectangles of the adjacent frame areas. As mentioned above, only black runs which actually exist within the area encircled by the ruled lines can be accurately recognized by eliminating black runs intruding from outside of the frame area.

The present invention is not limited to the specifically disclosed embodiments, and variations and modifications may be made without departing from the scope of the present invention. Above all, the CD-ROM shown in FIG. 3 may store either encoded or non-encoded instructions. The instructions may be installed from the CD-ROM to a hard disk drive first, transferred to a RAM in the memory unit 14 and then read by the processing unit 13. The CD-ROM may store either all or part of the instructions corresponding to the processes explained in the embodiments and flowcharts in the figures.

What is claimed is:

1. A character recognition method for recognizing characters from an original binary image containing characters encircled by ruled lines, both said characters and said ruled lines being defined by black runs comprising consecutive black pixels, the character recognition method comprising the steps of:
   a) extracting black runs each having a length greater than a predetermined length from said original binary image;
   b) extracting a ruled line rectangle defined by adjacent black runs from among the black runs extracted in step a) so that said ruled line rectangle completely encircles said adjacent black runs which are within a predetermined short distance from each other;
   c) deleting black pixels contained in said ruled line rectangle from said original binary image; and
   d) recognizing characters contained in said original binary image processed by step c).

2. The character recognition method as claimed in claim 1, wherein step c) comprises the step of:
   c-1) changing black pixels contained in said ruled line rectangle to white pixels.

3. The character recognition method as claimed in claim 1, wherein step a) comprises the steps of:
   a-1) compressing the binary image by a logical sum compression method so as to obtain a compressed binary image; and
   a-2) extracting the black runs from said compressed binary image.

4. The character recognition method as claimed in claim 3, wherein step b) includes the steps of:
   b-1) obtaining coordinate values of diagonal vertices of said ruled line rectangle; and
   b-2) converting the coordinate values of the compressed binary image into coordinate values of said original binary image so that said ruled line rectangle is extracted from said original binary image.

5. The character recognition method as claimed in claim 1, wherein step c) comprises the steps of:
   c-2) enlarging said ruled line rectangle; and
   c-3) changing black pixels contained in said enlarged ruled line rectangle to white pixels.

6. The character recognition method as claimed in claim 5, wherein step c-2) includes the step of:
   c-2-1) determining a degree of enlargement of said ruled line rectangle based on a width of said ruled line rectangle.

7. The character recognition method as claimed in claim 1, wherein step c) includes the steps of:
   c-4) extracting a black run rectangle adjacent to said ruled line rectangle, said black run rectangle containing at least one black run having a length less than a predetermined length and located within a predetermined distance from said ruled line rectangle; and
   c-5) changing black pixels contained in said black run rectangle extracted in step c-4) to white pixels.

8. The character recognition method as claimed in claim 1, further comprising, before step a), the steps of:
   m) calculating a certainty level of each of characters recognized from said original binary image; and
   n) proceeding to step a) when the certainty level of at least one of the characters is lower than a predetermined level.

9. The character recognition method as claimed in claim 8, wherein step m) includes the step of:
   m-1) extracting ruled lines contained in said original binary image;
   m-2) extracting a frame area encircled by said ruled lines;
   m-3) extracting a character image contained in said frame area;
   m-4) recognizing the characters in said character image; and
   m-5) calculating the certainty level of each of the characters.

10. A method for deleting ruled lines from an original binary image obtained by scanning a document, both characters and the ruled lines being defined by black runs comprising consecutive black pixels, the method comprising the steps of:
    a) extracting black runs each having a length greater than a predetermined length from said original binary image;
    b) extracting a ruled line rectangle defined by adjacent black runs from among the black runs extracted in step a) so that said ruled line rectangle completely encircles said adjacent black runs which are within a predetermined short distance from each other; and
    c) deleting black pixels contained in said ruled line rectangle from said original binary image.

11. The method for deleting ruled lines as claimed in claim 10, wherein step c) comprises the step of:
    c-1) changing black pixels contained in said ruled line rectangle to white pixels.

12. The method for deleting ruled lines as claimed in claim 10, wherein step a) comprises the steps of:
    a-1) compressing the binary image by a logical sum compression method so as to obtain a compressed binary image; and a-2) extracting the black runs from said compressed binary image.

13. The method for deleting ruled lines as claimed in claim 12, wherein step b) includes the steps of:
   b-1) obtaining coordinate values of diagonal vertices of said ruled line rectangle; and
   b-2) converting the coordinate values of the compressed binary image into coordinate values of said original binary image so that said ruled line rectangle is extracted from said original binary image.

14. The method for deleting ruled lines as claimed in claim 10, wherein step c) comprises the steps of:
   c-2) enlarging said ruled line rectangle; and
   c-3) changing black pixels contained in said enlarged ruled line rectangle to white pixels.

15. The method for deleting ruled lines as claimed in claim 14, wherein step c-2) includes the step of:
   c-2-1) determining a degree of enlargement of said ruled line rectangle based on a width of said ruled line rectangle.

16. The method for deleting ruled lines as claimed in claim 10, wherein step c) includes the steps of:
   c-4) extracting a black run rectangle adjacent to said ruled line rectangle, said black run rectangle containing at least one black run having a length less than a predetermined length and located within a predetermined distance from said ruled line rectangle; and
   c-5) changing black pixels contained in said black run rectangle extracted in step c-4) to white pixels.

17. The method for deleting ruled lines as claimed in claim 10, wherein step c) includes the steps of:
   c-6) extracting a frame area encircled by ruled line rectangles extending in a primary scanning direction and a secondary scanning direction, said frame area being defined by an outer side of each of said ruled line rectangles with respect to the center of said frame area;
   c-7) deleting the ruled lines from a character image contained in said frame area by changing black pixels contained in the black runs extracted in step a) to white pixels;
   c-8) changing black pixels contained in a black run contacting each side of said frame area to white pixels.

18. The method for deleting ruled lines as claimed in claim 17, wherein step c-8) includes the step of:
   c-8-1) changing black pixels contained in a black run positioned between one of the sides of said frame area and the black run adjacent to said one of the sides of said frame area within said frame area to white pixels.

19. A character recognition method for recognizing characters from an original binary image containing characters encircled by ruled lines, both said characters and said ruled lines being defined by black runs comprising consecutive black pixels, the character recognition method comprising the steps of:
   a) extracting black runs each having a length greater than a predetermined length from said original binary image;
   b) extracting ruled line rectangles defined by adjacent black runs from among the black runs extracted in step a) so that said ruled line rectangle completely encircles said adjacent black runs which are within a predetermined short distance from each other;
   c) extracting a frame area encircled by the ruled line rectangles extending in a primary scanning direction and a secondary scanning direction, said frame area being defined by an outer side of each of said ruled line rectangles with respect to the center of said frame area;
   d) deleting the ruled lines from a character image contained in said frame area by changing black pixels contained in the black runs extracted in step a) to white pixels;
   e) changing black pixels contained in a black run contacting one of sides of said frame area to white pixels; and
   f) recognizing characters contained in a character image in said frame area of said original binary image.

20. The character recognition method as claimed in claim 19, wherein step e) includes the step of:
   e-1) changing black pixels contained in a black run positioned between one of the sides of said frame area and the black run adjacent to said one of the sides of said frame area within said frame area to white pixels.

21. A processor readable medium storing program code for causing a computer to recognize characters from an original binary image containing characters encircled by ruled lines, both said characters and said ruled lines being defined by black runs comprising consecutive black pixels, the processor readable medium comprising:
   a) first program code means for extracting black runs each having a length greater than a predetermined length from said original binary image;
   b) second program code means for extracting a ruled line rectangle defined by adjacent black runs from among the black runs extracted by said first means so that said ruled line rectangle completely encircles said adjacent black runs which are within a predetermined short distance from each other;
   c) third program code means for deleting black pixels contained in said ruled line rectangle from said original binary image; and
   d) fourth program code means for recognizing characters contained in said original binary image processed by said third program code means.

22. The processor readable medium as claimed in claim 21, wherein said third program code means comprises:
   c-1) fifth program code means for changing black pixels contained in said ruled line rectangle to white pixels.

23. The processor readable medium as claimed in claim 21, wherein said first program code means comprises:
   a-1) sixth program code means for compressing the binary image by a logical sum compression method so as to obtain a compressed binary image; and
   a-2) seventh program code means for extracting the black runs from said compressed binary image.

24. The processor readable medium as claimed in claim 23, wherein said second program code means includes:
   b-1) eighth program code means for obtaining coordinate values of diagonal vertices of said ruled line rectangle; and
   b-2) ninth program code means for converting the coordinate values of the compressed binary image into coordinate values of said original binary image so that said ruled line rectangle is extracted from said original binary image.

25. The processor readable medium as claimed in claim 21, wherein said third program code means comprises:
   c-2) tenth program code means for enlarging said ruled line rectangle; and
   c-3) eleventh program code means for changing black pixels contained in said enlarged ruled line rectangle to white pixels.

26. The processor readable medium as claimed in claim 25, wherein said tenth program code means includes:

c-2-1) twelfth program code means for determining a degree of enlargement of said ruled line rectangle based on a width of said ruled line rectangle.

27. The processor readable medium as claimed in claim 21, wherein said third program code means includes:

c-4) thirteenth program code means for extracting a black run rectangle adjacent to said ruled line rectangle, said black run rectangle containing at least one black run having a length less than a predetermined length and located within a predetermined distance from said ruled line rectangle; and c-5) fourteenth program code means for changing black pixels contained in said black run rectangle extracted by said third program code means to white pixels.

28. The processor readable medium as claimed in claim 21, further comprising:

m) fifteenth program code means for calculating a certainty level of each of characters recognized from said original binary image; and n) sixteenth program code means for proceeding to said first program code means when the certainty level of at least one of the characters is lower than a predetermined level.

29. The processor readable medium as claimed in claim 28, wherein said fifteenth program code means includes:

m-1) seventeenth program code means for extracting ruled lines contained in said original binary image;

m-2) eighteenth program code means for extracting a frame area encircled by said ruled lines;

m-3) nineteenth program code means for extracting a character image contained in said frame area;

m-4) twentieth program code means for recognizing the characters in said character image; and m-5) twenty-first program code means for calculating the certainty level of each of the characters.

30. A processor readable medium storing program code for causing a computer to delete ruled lines from an original binary image obtained by scanning a document, both characters and the ruled lines being defined by black runs comprising consecutive black pixels, the processor readable medium comprising:

a) first program code means for extracting black runs each having a length greater than a predetermined length from said original binary image;

b) second program code means for extracting a ruled line rectangle defined by adjacent black runs from among the black runs extracted by said first program code means so that said ruled line rectangle completely encircles said adjacent black runs which are within a predetermined short distance from each other; and c) third program code means for deleting black pixels contained in said ruled line rectangle from said original binary image.

31. The processor readable medium as claimed in claim 30, wherein said third program code means comprises:

c-1) fourth program code means for changing black pixels contained in said ruled line rectangle to white pixels.

32. The processor readable medium as claimed in claim 30, wherein said first program code means comprises:

a-1) fifth program code means for compressing the binary image by a logical sum compression method so as to obtain a compressed binary image; and a-2) sixth program code means for extracting the black runs from said compressed binary image.

33. The processor readable medium as claimed in claim 32, wherein said second program code means includes:

b-1) seventh program code means for obtaining coordinate values of diagonal vertices of said ruled line rectangle; and b-2) eighth program code means for converting the coordinate values of the compressed binary image into coordinate values of said original binary image so that said ruled line rectangle is extracted from said original binary image.

34. The processor readable medium as claimed in claim 30, wherein said third program code means comprises:

c-2) ninth program code means for enlarging said ruled line rectangle; and c-3) tenth program code means for changing black pixels contained in said enlarged ruled line rectangle to white pixels.

35. The processor readable medium as claimed in claim 34, wherein said ninth program code means includes:

c-2-1) eleventh program code means for determining a degree of enlargement of said ruled line rectangle based on a width of said ruled line rectangle.

36. The processor readable medium as claimed in claim 30, wherein said third program code means includes:

c-4) twelfth program code means for extracting a black run rectangle adjacent to said ruled line rectangle, said black run rectangle containing at least one black run having a length less than a predetermined length and located within a predetermined distance from said ruled line rectangle; and c-5) thirteenth program code means for changing black pixels contained in said black run rectangle extracted by said twelfth program code means to white pixels.

37. The processor readable medium as claimed in claim 30, wherein said third program code means includes:

c-6) fourteenth program code means for extracting a frame area encircled by ruled line rectangles extending in a primary scanning direction and a secondary scanning direction, said frame area being defined by an outer side of each of said ruled line rectangles with respect to the center of said frame area;

c-7) fifteenth program code means for deleting the ruled lines from a character image contained in said frame area by changing black pixels contained in the black runs extracted by said first program code means to white pixels;

c-8) sixteenth program code means for changing black pixels contained in a black run contacting each side of said frame area to white pixels.

38. The processor readable medium as claimed in claim 37, wherein said sixteenth program code means includes:

c-8-1) eighteenth program code means for changing black pixels contained in a black run positioned between one of the sides of said frame area and the black run adjacent to said one of the sides of said frame area within said frame area to white pixels.

39. A processor readable medium storing program code for causing a computer to recognize characters from an original binary image containing characters encircled by ruled lines, both said characters and said ruled lines being defined by black runs comprising consecutive black pixels, the processor readable medium comprising:

a) first program code means for extracting black runs each having a length greater than a predetermined length from said original binary image;

b) second program code means for extracting ruled line rectangles defined by adjacent black runs from among the black runs extracted by first program code means so that said ruled line rectangle completely encircles said adjacent black runs which are within a predetermined short distance from each other;

c) third program code means for extracting a frame area encircled by the ruled line rectangles extending in a primary scanning direction and a secondary scanning direction, said frame area being defined by an outer side of each of said ruled line rectangles with respect to the center of said frame area;

d) fourth program code means for deleting the ruled lines from a character image contained in said frame area by changing black pixels contained in the black runs extracted by said first program code means to white pixels;

e) fifth program code means for changing black pixels contained in a black run contacting one of sides of said frame area to white pixels; and f) sixth program code means for recognizing characters contained in a character image in said frame area of said original binary image.

40. The processor readable medium as claimed in claim 39, wherein said fifth program code means includes:

e-1) seventh program code means for changing black pixels contained in a black run positioned between one of the sides of said frame area and the black run adjacent to said one of the sides of said frame area within said frame area to white pixels.

* * * * *